(12) United States Patent
Hawver et al.

(10) Patent No.: US 8,021,043 B2
(45) Date of Patent: Sep. 20, 2011

(54) MAGNETIC SHIELDING FOR PORTABLE DETECTOR

(75) Inventors: Jeffery R. Hawver, Marion, NY (US); Steven D. Daniels, Churchville, NY (US); Robert Asento, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 238 days.

(21) Appl. No.: 12/413,678

(22) Filed: Mar. 30, 2009

(65) Prior Publication Data

US 2010/0246771 A1 Sep. 30, 2010

(51) Int. Cl.
*H01J 31/49* (2006.01)
(52) U.S. Cl. ........................................................ 378/189
(58) Field of Classification Search .................... 378/189
See application file for complete search history.

(56) References Cited

U.S. PATENT DOCUMENTS

| | | | |
|---|---|---|---|
| 4,331,285 A | | 5/1982 | Gottwals |
| 4,474,676 A | * | 10/1984 | Ishino et al. ............... 252/62.54 |
| 4,647,714 A | | 3/1987 | Goto |
| 4,890,083 A | | 12/1989 | Trenkler et al. |
| 6,627,810 B2 | | 9/2003 | McEwen et al. |
| 7,091,491 B2 | | 8/2006 | Kautzer et al. |
| 2004/0036885 A1 | | 2/2004 | Olson et al. |
| 2007/0045553 A1 | | 3/2007 | Adachi |
| 2007/0269648 A1 | | 11/2007 | Schuh et al. |

FOREIGN PATENT DOCUMENTS

| | | |
|---|---|---|
| GB | 2 135 679 | 9/1984 |
| JP | 11-026981 | 1/1999 |
| JP | 2002-331609 | 11/2002 |

OTHER PUBLICATIONS

European Search Report, referring to European Patent Appln. No. 10 003 485.9, filed Mar. 30, 2010, Inventor Hawver, Jeffery R.
"Nanocrystalline Soft Magnetic Materials" data sheet from website at http://www.vacuumschmelze.de/dynamic/en/home/researchampinnovation/materialsdesign/nanocrystallinesoftmagneticmaterials.php, Aug. 7, 2008.
Nanocrystalline soft magnetic material FINEMET® brochure No. HL-FM10-D from Hitachi Metals Ltd., Apr. 2005, obtained from website at http://www.hitachi-metals.co.jp/e/prod/prod13/p13_01.html.

* cited by examiner

*Primary Examiner* — Jurie Yun

(57) ABSTRACT

A digital radiographic detector has a detector panel that forms digital image data according to radiation exposure energy. An enclosure houses the detector panel, formed from an electrically conductive material and having a base with an inner base surface and an outer base surface and having, along its perimeter, one or more side walls that extend orthogonally from the inner base surface. A base magnetic shield extends as a layer of nanocrystalline material across at least one of the inner base surface and the outer base surface. A cover is formed from a non-conductive material and has a cover magnetic shield of a layer of a metallic alloy bonded to an inner surface. A side wall magnetic shield extends along one or more surfaces of the one or more side walls, wherein the side wall magnetic shield has at least one of the nanocrystalline material or the metallic alloy.

19 Claims, 23 Drawing Sheets

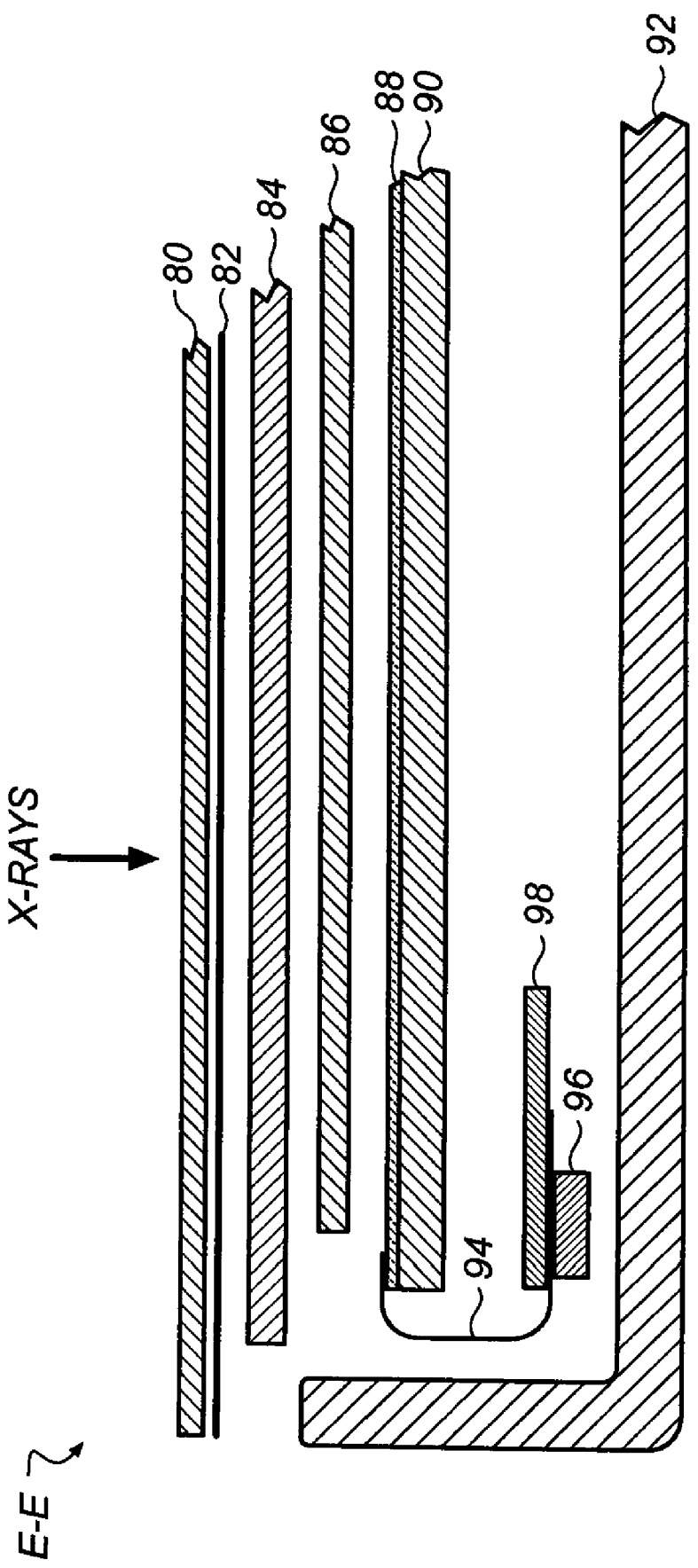

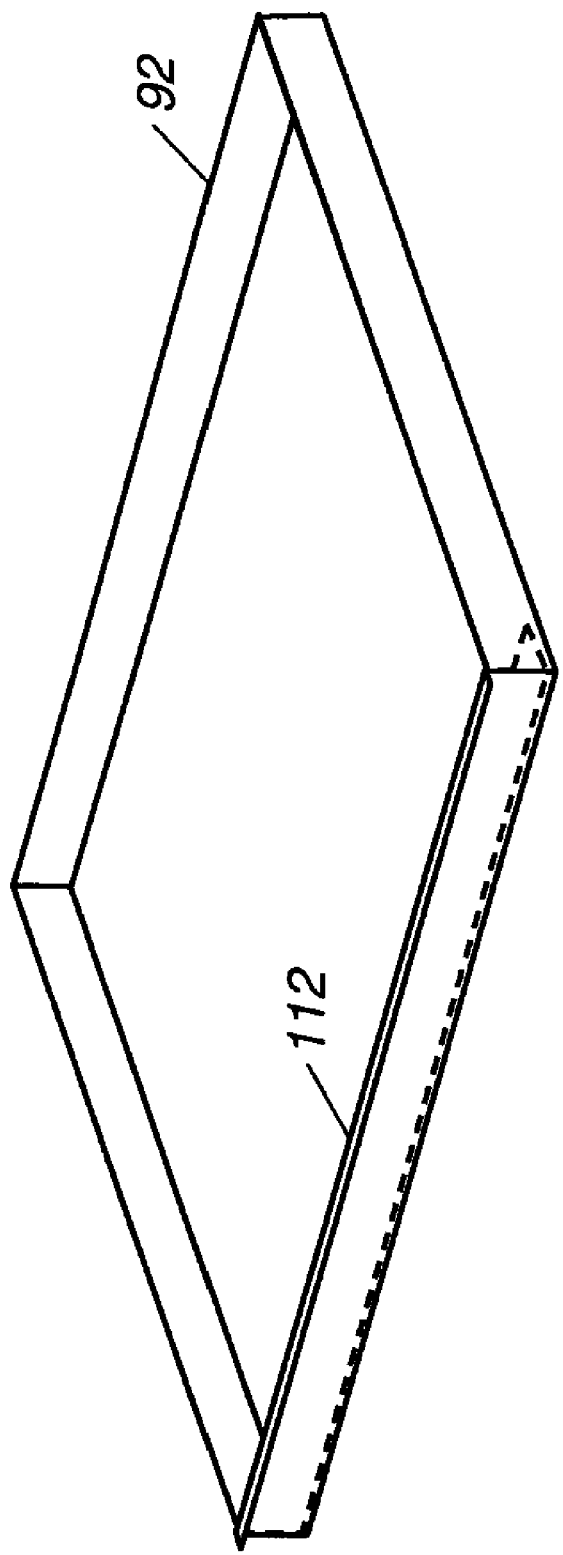

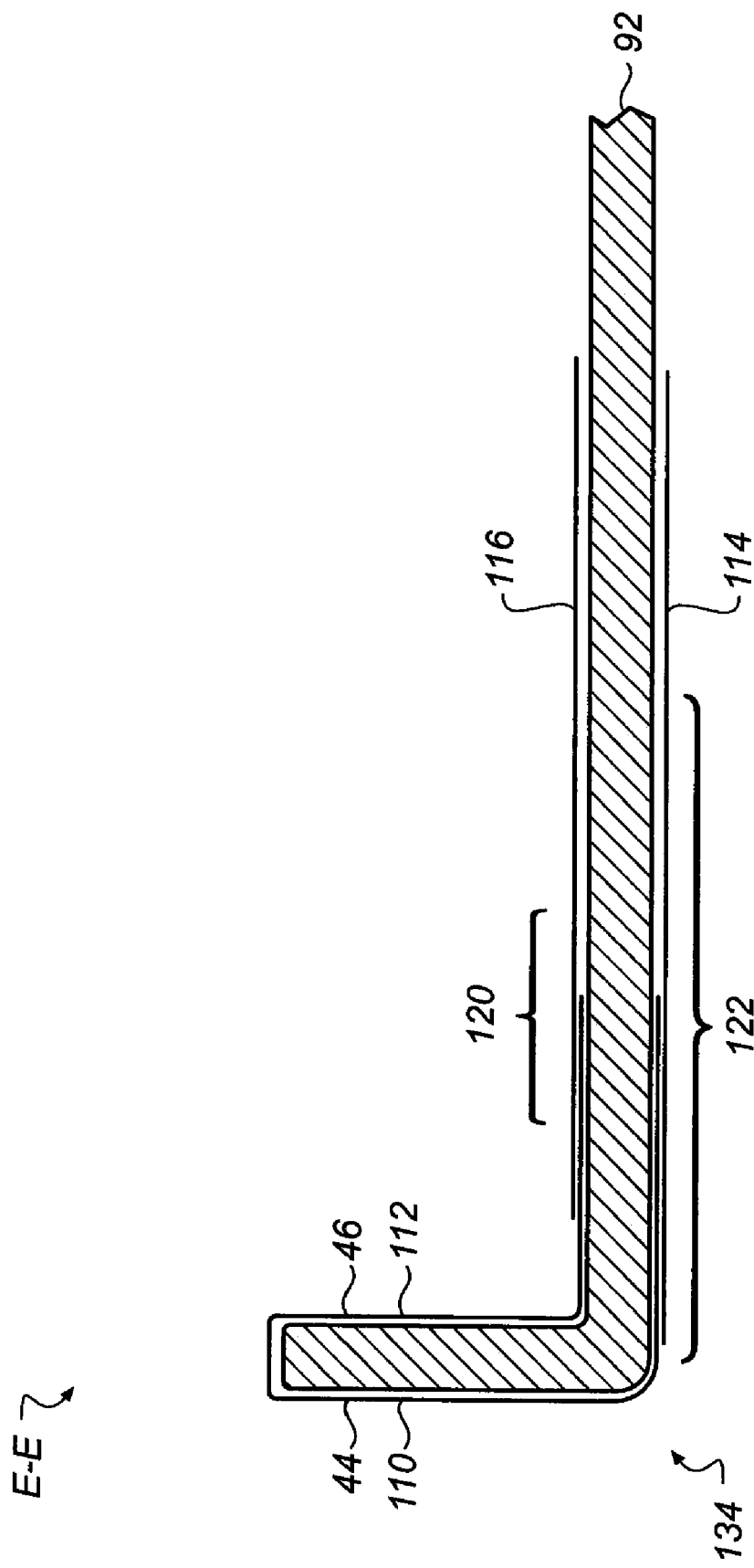

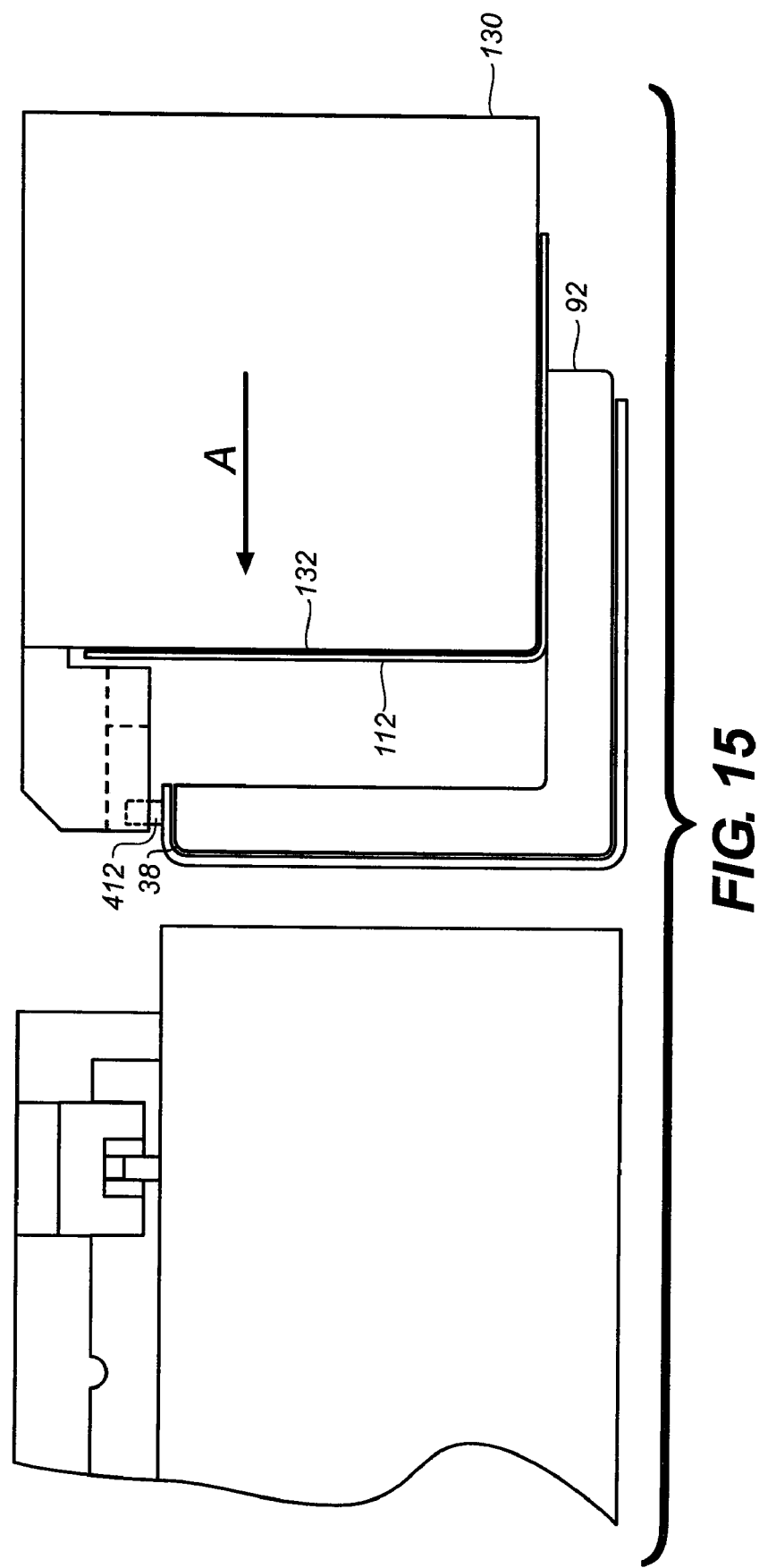

MAGNETIC SHIELDING FOR PORTABLE DETECTOR

FIELD OF THE INVENTION

The invention relates generally to digital radiographic detectors and more particularly to magnetic shielding for portable digital radiographic detectors.

BACKGROUND OF THE INVENTION

Digital radiography (DR) is increasingly preferred as an alternative to both film-based and Computed Radiography (CR) imaging technologies that use photosensitized film or photostimulable storage phosphors to obtain image content from radiation exposure. With digital radiography, the radiation exposure energy that is captured on radiation sensitive layers is converted, pixel by pixel, to electronic image data which is then stored in memory circuitry for subsequent readout and display on suitable electronic image display devices. One driving force in the success of digital radiography is the ability to rapidly visualize and communicate stored images via data networks to one or more remote locations for analysis and diagnosis. With DR imaging, this can be done without the delay that results when film is first developed and checked, then either packaged and delivered to a remote location or input to a separate scanner apparatus to provide digitized image data.

Flat panel digital radiographic (DR) imaging systems enjoy a number of advantages over conventional film-based or earlier CR systems. Among its salient advantages is the capability of the DR system to obtain radiographic image data without the need for an operator or technologist to move, handle, process, or scan any type of imaging medium following exposure. Data that is downloaded directly from the DR receiver panel is then quickly available for viewing and diagnosis on-site or at any appropriately networked viewer workstation.

Due to factors such as size, weight and expense, earlier flat panel digital radiographic (DR) imaging detectors were permanently mounted in table and wall bucky structures specially designed to accommodate them. More recently, due to technological advances in solid state electronics that provide reduced size and power requirements, a more portable and retrofittable type of digital detector is envisioned. Ideally, a more portable DR detector would have the data-gathering advantages of earlier detectors, but with reduced weight and size that could allow its conformance to the ISO-4090 35×43 cm standard cassette profile. This would allow the DR detector to be fitted into existing table or wall x-ray units that also conform to this ISO standard. This conformance promises to expand the usability of DR detection as a replacement for existing film and CR cassette-equipped x-ray rooms, obviating the need to upgrade or modify existing x-ray table and wall equipment, as is done currently. As a result, retrofit DR detectors would be usable with systems that are now constrained for use only with film and CR detectors.

In addition to reduced size and weight, it would be desirable to provide a truly portable digital detector that is untethered for wireless communication and that contains on-board battery power. With these additional advantages, the portable DR detector can be more easily used with existing x-ray imaging systems. This would help to provide a detector that can be readily moved from one location to another as needed, without the cumbersome requirements and risks imposed by the need to connect power or data cables.

DR technology offers promise as a possible retrofit to existing imaging systems and may help to improve workflow, efficiency, and timeliness in providing diagnostic information, at reduced upgrade cost. However, a number of problems remain to be successfully addressed. Among these problems are difficulties related to noise from nearby equipment, such as earlier bucky units. Because of their large sensing area and overall sensitivity, DR detectors are particularly susceptible to ElectroMagnetic Interference (EMI) from surrounding electromagnetic sources, such as grid motor drives and automatic exposure control power supplies. Extraneous electromagnetic noise interferes with the quality of the captured X-ray image data and can introduce artifacts that compromise the value of these images in clinical diagnostic applications. Low frequency magnetic fields have been found to be particularly problematic because of the difficulty in shielding against this type of EMI.

To appreciate the problem of shielding for this type of device, it is useful to first consider the component-level structure of the DR detector and the nature of the induced noise. The schematic diagram of FIG. 1 shows representative sensing and data gathering circuitry of the radiological image detector. A radiological imaging detector panel 10 is an array with millions of photosensors arranged in a row-column matrix and row and column readout lines 20 and 22 respectively. For each pixel 14, a photosensor 12, such as a photodiode, produces an electric charge that is proportional to the amount of radiant energy it receives. The charge produced by each sensor is read out using an array of charge amplifiers 26. Each photosensor has a connection to a particular column readout line through an associated thin film transistor or TFT 16. A bank of gate drivers 18 selectively turns on a given row of thin film transistors, allowing charge from the photosensors to flow into each of the charge amplifiers 26. Charge amplifiers 26 then convert the charge to a voltage that is provided on a signal bus 30 and can then be readily converted to a digital value through an Analog-to-Digital A/D converter 28 and through associated multiplexer (MUX) 32 circuitry. Related support circuitry for the pixel array includes a bias supply 34 that provides bias lines 24 to photosensors 12.

For any pixel 14, the amount of charge generated in photosensor 12 during an image readout operation is on the order of tens of picocoulombs. This extremely small signal travels through the long column readout lines 22 that are distributed over the imaging area of the panel. For a typical imaging detector panel 10, readout lines 22 can be up to 43 cm long, providing a path of significant length for induced noise.

The schematic diagram of FIG. 2 shows photosensor readout electronics for each pixel 14 in more detail. Here, individual photosensor 12, shown as a photodiode, is switched by TFT 16, under control of a gate driver 50 along a signal path 52 to charge amplifier 26 through the column readout trace line 22. The inherent resistance and capacitance of circuit traces are represented for both signal path 52 and readout line 22, enclosed in dashed outline as an equivalent circuit 54. With a switch 56 open, charge amplifier 26 integrates the signal and, with a switch 68 closed, provides a reference charge value to a storage capacitor 64 in a Correlated Double Sampling (CDS) switch 60. A switch 66 provides the signal from amplifier 26 to a storage capacitor 62 once the signal representing pixel charge level is obtained.

Interference from magnetic fields arises when a conductor is placed within a changing magnetic field. This is sometimes described as change in flux linkage of the field with a conductive loop. The changing flux in a conductive loop results in an induced electromotive force or voltage. If the conductor is part of a high impedance, low voltage signal path, the magnetically induced voltage adds to the original signal as noise that interferes with the measured signal.

If readout lines 22, of FIGS. 1 and 2 link a changing magnetic flux, there can be an induced error voltage in the readout column line that degrades the image quality of the detector. According to Faraday's law, the magnitude of the induced voltage is given by:

$$\varepsilon = -\frac{d\phi}{dt} \quad \text{Equation 1}$$

where $\varepsilon$ is the induced electromagnetic force (emf) in volts and $\phi$ is the magnetic flux linking a single turn in webers.

From Equation 1, it is apparent that an induced voltage in the conductor with a time varying magnetic field is directly proportional to the time rate of change of the flux linking the conductor. Both PWM motor drives and flyback transformers, for example, have very high pulsing inductor currents that generate high $d\phi/dt$ values. Their frequencies usually fall in the 20 kHz to 100 kHz range, over which a Faraday type shield is not very effective. Since the readout lines, shown in FIGS. 1 and 2, can be up to 43 cm long, they can be quite susceptible to the extraneous magnetic fields that potentially exist in some radiological imaging suites.

Referring again to FIG. 2, to accurately integrate the small detected charge to a voltage level that can be converted to a digital signal, the circuitry of charge amplifier 26 presents a very high impedance to the detected signal. This high-impedance circuitry is sensitive and, at the same time, very susceptible to extraneous electric and magnetic fields that introduce noise into the signal. Once extraneous noise has been introduced, it can be difficult or impossible to remove. Measures taken to keep external electromagnetic noise from the sensitive electronics of the detector typically include shielding.

A common type of shielding that is employed for electronic devices is commonly termed Faraday shielding, in which sensitive high-impedance electronics are enclosed inside a housing that has a conductive material of some kind. The Faraday shield mechanism can be a metal enclosure made of aluminum or a plastic housing onto which a thin conductive coating has been applied. The conductive material of the housing is then connected to the same ground point as the ground of the electronics. This arrangement, using basically the same principles employed with coaxial cable, effectively shields the circuitry from extraneous electric fields.

High frequency magnetic fields at frequencies in excess of 1 MHz can be shielded using Faraday shielding techniques. This is due to the fact that an AC magnetic field induces eddy currents in the conductive metal of the enclosure that oppose the applied magnetic field.

Eddy current cancellation, however, becomes less and less effective as the frequency of the magnetic field decreases below a certain point. For example, magnetic fields in the range of 60 Hz to 100 kHz exhibit very little attenuation from a conductive Faraday shield. A DC magnetic field (0 Hz) will pass completely through a piece of aluminum or copper because no eddy current is formed.

In practice, Faraday shielding has little or no value for magnetic field frequencies below 100 kHz. Thus, frequencies in this lower range, such as frequencies from 60 Hz power lines, remain a potential source of interference for high impedance electrical circuitry, even where Faraday shielding is used.

Unfortunately, there can be any number of sources of low frequency magnetic fields in areas of radiological imaging detector use. Certain types of equipment are known to radiate low frequency electromagnetic fields. Examples readily found in and around X-ray tables and Bucky drawers include PWM motor drives used in grid motor drive units and flyback transformers found in voltage supplies. Both of these sources can generate magnetic fields that fall in the frequency range of 20 to 100 kHz, a range not effectively shielded using conventional Faraday shielding.

By design, components that generate significant levels of EMI are not used for built-in or integrated DR systems. From the beginning stages, such systems are carefully designed so that possible interference from system components is eliminated or at least minimized. However, this is not often the case with earlier x-ray systems that were originally designed for use with film or CR media. As a result, portable DR equipment that is to be used as retrofit for existing hardware is protected, inasmuch as possible, from potential sources of EMI at intermediate- or lower-frequency ranges. This protection accounts both for environments where there are known and predictable sources of EMI and for conditions in which EMI is not easily predicted, wherein the relative location and intensity of the generated EMI field can be unknown or changing.

It is known that an external, lower-frequency magnetic field can be redirected around a circuit and prevented from interfering with it by enclosing sensitive electrical circuitry inside a properly designed enclosure; as shown in FIG. 3. Materials effective for shielding low frequency magnetic fields in this way have certain desirable ferromagnetic properties. Typically, acceptable materials include very soft magnetic materials such as nickel-iron based alloys that exhibit high permeability.

There are a relatively limited number of materials available for low-frequency magnetic shielding, and these materials have some limitations with respect to weight and workability. Permalloy and Mu metal are two examples of shielding materials commonly used for this purpose. These materials are available in a range of different shapes and sizes. Sheet forms typically vary in thickness from about 0.002 to 0.010 inches for foils and up to about 0.065 inches or more for sheets and plates.

Additionally there are also some relatively new magnetic shielding materials now available based on nanocrystalline iron alloys. A nanocrystalline material exhibits an extremely fine-grained microstructure with grain sizes as small as 10 nanometers. Conventional soft magnetic materials such as Permalloy and Mu metal have much larger grain structures that can exceed 1 μm. It has been generally observed that as the size of crystal grain structures decreases, the soft magnetic properties of a material tend to degrade and the coercive force increases. However, it has been found that this relationship actually reverses for grain structures below 100 nanometers.

Nanocrystalline materials with high permeability and large surface area suitable for shielding applications can be manufactured using several different manufacturing techniques. One technique for the fabrication of FINEMET® uses rapid quenching of a molten alloy consisting of Fe, Si B and other trace elements at one million ° C./second. This produces strips of an amorphous metal with extremely small uniform crystals. To achieve large surface area, strips of this material are then welded together with a small overlap between adjacent strips. The welded strips are then laminated between layers of plastic. This material is available in rolls up to fifteen inches wide that can be conveniently cut to the desired length and width and attached to a structure with double sided adhesive tape.

It has also been found that materials having nanocrystalline microstructures can be produced using pulsed electric fields during an electrodeposition process. Normally electrodeposition of a metal produces crystals with random orientations and grain sizes in the micrometer scale. However, modifying this process by pulsing the electric current during the plating process alters the growth condition of the crystals, thereby producing a smaller grain size. Additionally, it has been found that alternately reversing the pulse current, for a short duration, produces even finer grain structures. This is due to the fact that during the time the electric field is reversed, a process of electro-decomposition occurs that creates nanopores in the plated structure. These nanopores are then filed in during the next forward current pulse. This constrains the growth of crystal grains to the nanometer scale.

Nanocrystalline iron-nickel alloys that exhibit high permeability have been produced using pulsed electrodeposition. While iron and nickel in various proportions make up the bulk of this type of material, other elements in smaller proportions can be introduced to enhance the magnetic performance of electrodeposited nanocrystalline materials. For the purpose of the present disclosure, these minor variations are considered within the scope of the term nanocrystalline iron-nickel alloys.

Using an electrodeposition process such as this, a layer of nanocrystalline iron-nickel alloy having high permeability can be produced and can be directly applied to structures of relatively large surface areas to serve as magnetic shields, without the necessity of first cutting the material to shape and then applying an adhesive to the structure.

Soft magnetic materials used for low-frequency magnetic field shielding are readily magnetized and demagnetized. These materials, used primarily to control or channel the flux of the magnetic field, typically have intrinsic coercivity less than about 10 $Am^{-1}$. A parameter that is often used as a figure of merit for soft magnetic materials is the relative permeability $\mu_r$, which is a measure of how readily the material responds to an applied magnetic field. A material with high permeability has lower magnetic reluctance than a material with low permeability. Magnetic materials of this type provide a low reluctance path for the magnetic field to follow, rather than a higher reluctance path, such as that of air. By way of comparison, air is used as a standard, so that relative permeability of a material is conventionally expressed relative to that of air, at a given frequency. Air has a relative permeability of 1 at a frequency of 1 kHz, while certain Mu or Permalloy metals may exhibit a relative permeability that is from about 5,000 to as much as 250,000 or more, at a frequency of one kilohertz.

Magnetic shielding techniques using highly permeable materials such as Permalloy and Mu metal have been employed for a number of years to shield devices susceptible to interference from low-frequency magnetic fields. Applications of this type for example have been used for the shielding of photomultiplier tubes, CRT or cathode ray tubes and sensitive optical gyroscopes. It has been found that layering of ferromagnetic materials is an effective magnetic shielding technique, with successive shielding layers separated between layers of non-ferromagnetic materials. The non-ferromagnetic material might be any of the non-ferrous metals such as aluminum or brass, various plastics, or air.

One example with layered shielding is shown in the cross-sectional view of a container in FIG. 4. Here, a layer of magnetically permeable material 72 is disposed against inside and outside walls of the container formed from non-ferromagnetic material 74. Each layer of ferromagnetic material contributes to the overall attenuation factor. This dual-layer arrangement provides improved performance over a single layer, even where the single layer may be thicker than the combined total thickness of the two separate layers.

The technique described with reference to FIG. 4 has been used, for example, to shield sensitive optical gyroscopes as described in U.S. Pat. No. 6,627,810. When using such a layered technique, the number of individual layers of magnetic material is not limited to two; there have been applications that use three or four distinct layers, where each ferromagnetic shielding layer is separated from the next with a layer of non-magnetic material. In some applications, the material in each magnetic layer may have different properties, including different permeability characteristics. Use of lower permeability materials on the outside of a structure provides a higher saturation that reduces the strength of the field for the next layer. It can also be advantageous to use different magnetic materials on different portions of the layers to take advantage of other properties such as lower cost or greater durability. With reference to FIG. 4, for example, it might be desirable to use a different material 72 on the inside layer as opposed to the outside.

Although the surface coverage and layering approach described with respect to FIG. 4 is relatively straightforward in concept, there can be considerable difficulty that prevents this approach from being used effectively in practice. For example, the relatively simple geometry of the cylinder described in the '810 disclosure lends itself readily to the application of pre-formed shielding material 72. However, even if a preformed shield is used, its magnetic shielding performance can be seriously degraded if the material is stressed, such as by being bent or folded. Any type of mechanical stress on the low permeability material, such as: bending, forming, shearing, punching, drawing, or subjecting it to high temperatures such as those used during welding, can cause work hardening of the material. In the embodiment of FIG. 4, for example, the internal and external shielding layers of the container have 90-degree bends in order to conform to the structure.

Fringe effects present additional problems for enclosure shielding. In order to shield effectively, the magnetic shielding material encases the entire detector, preferably without gaps between any segments of shielding that would allow fringing. FIG. 5 shows a cross-section of an enclosure with a cover section 40 and a bottom base section 42 and shows how fringing can occur where segments of a shield are discontinuous even with cover section 40 in place. Fringing can be a particular problem for the DR detector because, during the lifetime of the detector, access can be required to internal components as well as to external connectors. Fringing is likely wherever there are gaps or breaks in continuity in magnetic shielding material, such as where there are removable covers, cable access ports, or components provided on the surface of the device.

It is noted that the magnetic shielding shown in FIGS. 4 and 5 cannot be fabricated without performing some type of bending over sharp radii, drawing or welding operation on the high permeable material before assembling it onto a cylindrical structure as shown in FIGS. 4 and 5. Any of the aforementioned stressful operations that work-harden the magnetic material effectively damage or destroy its beneficial shielding properties. Following any operation causing mechanical stress, it is necessary to restore the material's high permeability and thus its magnetic shielding properties by an annealing process.

Annealing for this type of material can be a fairly complex and costly operation. In annealing, the soft permeable alloy, typically Mu metal or Permalloy, is subjected to high heat, either in a vacuum or in a controlled atmosphere, such as in a hydrogen atmosphere. During the heating cycle the magnetic material is raised to a temperature of around 2100 degrees Fahrenheit and held at this temperature for several hours followed by a controlled cooling cycle to maximize the permeability.

Annealing also introduces problems. High annealing temperatures can cause the shielding material to become quite soft, resulting in the loss of dimensional integrity of the prefabricated part. Parts that are to be subjected to high annealing temperatures after fabrication is constructed with sufficient thickness to prevent excessive warping during the heating cycle. Thus, for example, thin foils would not be appropriate for pre-formed structures; a preformed structure formed from a thin foil will readily become curled and warped and be completely useless after annealing. Thus, in order to make it practical to use pre-formed magnetic shield structures, the prefabricated parts have sufficient thickness to preserve dimensional tolerances during the annealing process. For Permalloy and Mu materials, this necessitates material thicknesses far greater than a typical foil thickness of 0.002 to 0.004 inches. This adds bulk and weight to the completed, shielded device and, although this may not be a problem for some types of equipment, added bulk and weight are not compatible with what is needed for shielding a portable DR detector.

For portability and industry acceptance, a portable DR detector design meets fairly stringent dimensional profile and weight requirements. These two factors require that any type of shielding material be as light and thin as possible, essentially precluding the use of any known material other than a relatively thin Mu foil alloy. The fairly complex internal and external shape of a retroffitable detector adds further to the shielding problem and greatly complicates the design problems for prefabricated parts, due to the difficulty of pre-forming a thin soft foil into complex shapes, as discussed above, without applying some type of potentially damaging mechanical stress. Further, even where thin Mu metal foils are provided without being pre-formed and annealed, conventional methods for adhering Mu metal foils to a complex folded structure are highly subject to human error and are likely to result in disappointing manufacturing yields.

Full encasement of the DR detector requires a layer of ferromagnetic material on the top cover of the detector where the X-rays enter. This layer of material will unfortunately absorb some portion of the X-ray energy entering the detector and reduce its overall efficiency, limiting the detective quantum efficiency or DQE. This may potentially require the level of X-ray exposure to be increased, exposing the patient to a higher dose of radiation.

In summary, conventional shielding techniques are not compatible with the design and intended function of the DR detector for a number of reasons, including at least the following:

(i) Undesirable levels of X-ray attenuation. Unfortunately, conventional coatings or coverings that are known to be effective low-frequency EMI shields tend to be formed from materials that attenuate the X-ray signal. Use of such materials in a conventional shielding arrangement would require an increased radiation dose in order to obtain the diagnostic image.

(ii) Excessive weight. Conventional shielding materials themselves can add significant weight to the DR detector, making the device less portable and less desirable as a replacement for its film or CR counterparts.

(iii) Constraints on dimension. In order to fit within the ISO-4090 35×43 cm standard cassette profile and provide sufficient imaging area, shield materials are limited as to thickness.

(iv) Need for full encasement. The DR receiver panel is fully encased within the shield. Gaps between portions of a shield are undesirable due to fringing.

(v) Difficulty in working with materials. This applies to both shaping the shield materials and applying them to the detector surface.

Unable to resolve these difficulties with conventional shielding techniques for effectively shielding the DR detector while meeting stiff dimensional, weight, and performance requirements, researchers have looked elsewhere for ways to counter the EMI problem. As just one example, U.S. Pat. No. 7,091,491 entitled "Method and Means for Reducing Electromagnetic Noise Induced in X-Ray Detectors" to Kautzer et al. states that EMI shielding for such detectors is not feasible and discloses sampling an additional exposure cycle for compensation. However, such techniques assume that the induced noise distribution is at least somewhat constant, which is not the case for many types of EMI.

Thus, a portable DR detector desires EMI shielding that is compatible with requirements for low weight, has minimum impact on dimensions, provides suitable shielding performance, and can be feasibly manufactured.

SUMMARY OF THE INVENTION

It is an object of the present invention to advance the art of diagnostic imaging. With this object in mind, the present invention provides a digital radiographic detector comprising: a detector panel that forms digital image data according to radiation exposure energy; an enclosure that houses the detector panel, the enclosure formed from an electrically conductive material and having a base with an inner base surface and an outer base surface and having, along its perimeter, one or more side walls that extend orthogonally from the inner base surface; a base magnetic shield that extends as a layer of nanocrystalline material across at least one of the inner base surface and the outer base surface of the enclosure; a cover formed from a non-conductive material and comprising a cover magnetic shield of a layer of a metallic alloy bonded to an inner surface of the cover; a side wall magnetic shield that extends along one or more surfaces of the one or more side walls, wherein the side wall magnetic shield comprises at least one of the nanocrystalline material or the metallic alloy.

A feature of the present invention is the adaptation of various materials and techniques for applying shielding materials to inner and outer surfaces of a portable DR detector.

An advantage of the present invention is that it provides EMI shielding for a portable DR detector with reduced weight and size. This would allow the portable DR detector to be used as a retrofit with existing x-ray equipment that may have sources of low frequency magnetic fields that would otherwise interfere with and prevent the use of conventional DR technology.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 7 is a cross-sectional view of an encasement and lid for a DR detector.

FIGS. 8A, 8B, 8C, 8D, 8E, and 8F show a sequence for applying shield material to an enclosure for a DR detector in one embodiment;

FIG. 9C is a cross-sectional side view of another alternate embodiment of a shield arrangement for a DR detector.

FIG. 15 shows a tool used for adhering a side wall shield to an enclosure.

DETAILED DESCRIPTION OF THE INVENTION

Figure 1:
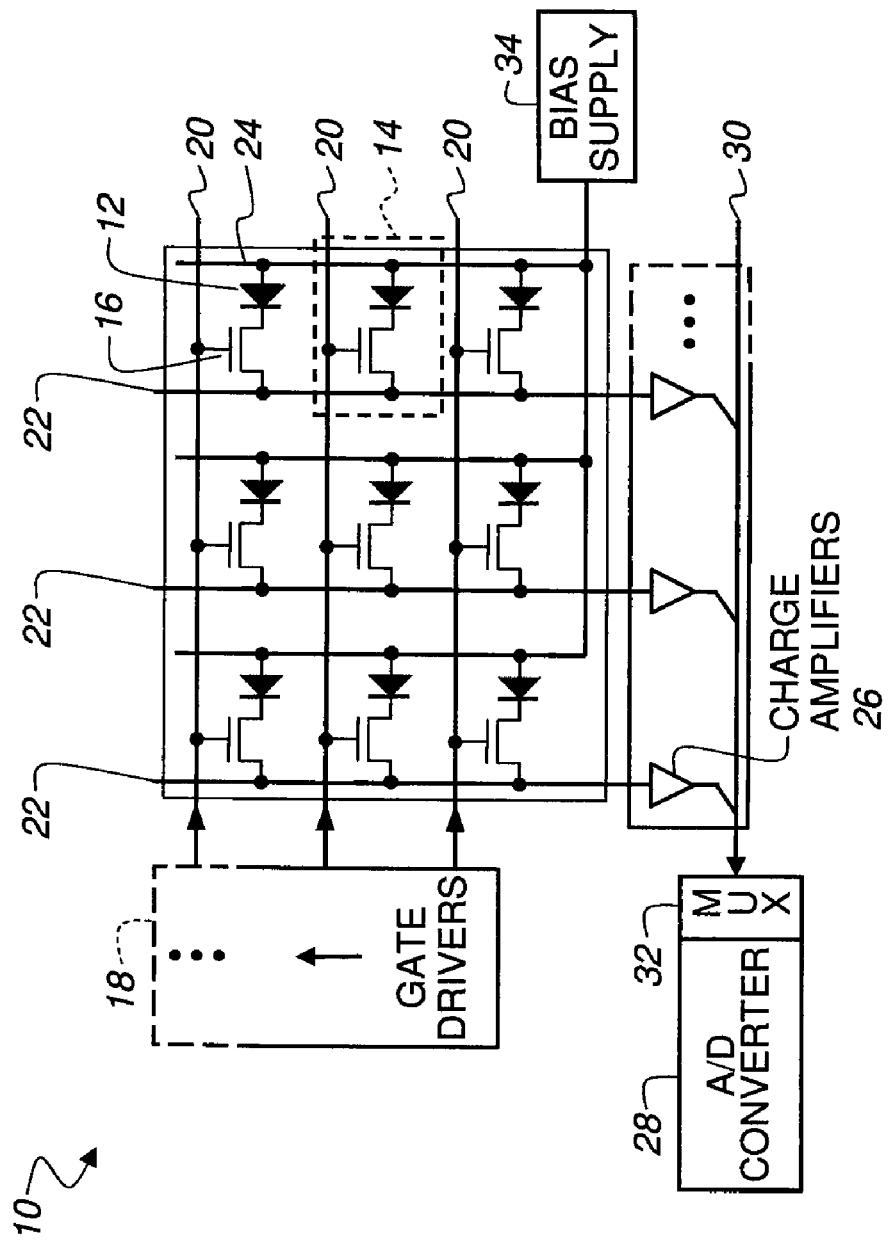
FIG. 1 is a schematic diagram showing representative sensing and data gathering circuitry of the radiological image detector.

The following is a detailed description of the preferred embodiments of the invention, reference being made to the drawings in which the same reference numerals identify the same elements of structure in each of the several figures.

As noted in the background section, high impedance sensing circuitry can be very susceptible to low frequency magnet fields, particularly if their input signal lines link a magnetic flux. By the nature of the DR panel composition and function, high-impedance readout circuits are expected to be primarily located near edges of the detector.

In the context of the present disclosure, the terms "top" and "bottom" or "vertical" are not are not intended to be limiting and are not used to define a particular orientation of a radiographic detector or its components, but are intended primarily to indicate the positional relationships of opposing surfaces or other features relative to each other.

In the context of the present disclosure, "high permeability" is defined as a relative magnetic permeability that is at least 2500 or greater, at 1 kHz. As noted in the background material, relative permeability values compare permeability with that of air, at the stated frequency.

In the context of the present disclosure, two surfaces are considered to be substantially orthogonal when they are disposed at angles that are within about 90+/−12 degrees of each other.

Figure 6:
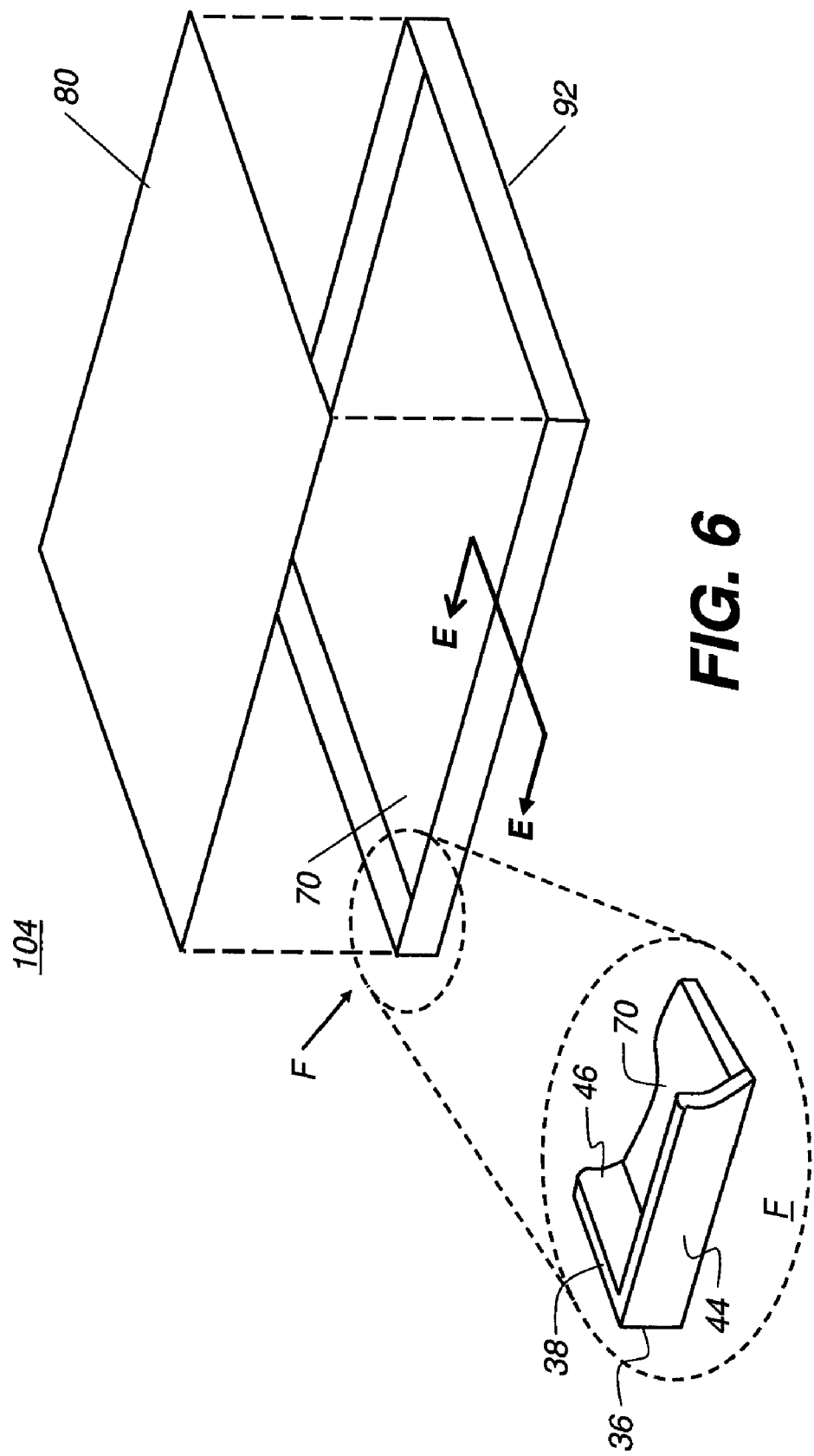
FIG. 6 is a cross-sectional side view of components of a DR detector, separated to show their relative positions.

In order to understand how shielding is provided in embodiments of the present invention, it is first useful to consider the overall geometry of the DR detector panel and its components and how the DR detector panel is constructed. The perspective view of FIG. 6 shows an enclosure 92 and a cover 80 used to house a DR detector 104, with internal components not shown for clarity. Aluminum enclosure 92 is a five sided box that forms the back and sides of the detector housing and has a base 70 that defines its width and height dimension. Four side walls extend orthogonally from base 70, along the perimeter of base 70, extending in the direction of the inner surface of enclosure 92 and defining the depth dimension of enclosure 92. A small portion of enclosure 92 at a corner 36, shown in enlargement F, gives an idea of the relative complexity of the shielding problem, given the limited number of materials that are available and their relative workability. As a five-sided box, enclosure 92 has eleven planar surfaces that are covered with shielding material, including top and bottom surfaces of base 70, four outer side walls 44, four inner side walls 46, and a top edge 38 between these side walls and used to seat cover 80. Moreover, in one embodiment, these different surfaces are substantially orthogonal to each other at their intersections along enclosure 92, with particular complexity at corners 36. There are sixteen points, four in each corner 36, at which three orthogonal surfaces intersect. Thus, it can be seen that, although it seems a relatively simple structure, the five-sided box shape of enclosure 92 actually provides a challenging surface for applying Mu foil and other types of lightweight shielding in foil or sheet form. The need for additional ports for fasteners, data connectors, and access to replaceable or rechargeable components and other devices adds even further complexity to this problem.

The relative difficulty of this shielding process is further compounded by requirements for portability and by shortcomings of the shielding materials themselves. As noted earlier in the background section, thin Mu metal foils, known to be among the best available lightweight shielding materials, can be difficult to handle in manufacturing assembly. Thus, it can be appreciated that the task of providing a suitable lightweight EMI shield for DR detector 104 is particularly challenging. The subsequent series of figures show details of DR detector panel construction and show how EMI shielding for DR detector 104 is provided in one embodiment.

FIG. 7 shows a cross section side view of internal components in an edge portion of a DR detector prior to EMI shielding, with typical components vertically offset from their assembled positions for clarity. The arrangement shown in FIG. 7 only illustrates a portion of an edge cross-section (view E-E as shown in FIGS. 6 and 7).

Detector cover 80 is typically made from a structurally rigid material that is somewhat transparent to x-rays. This material can be a carbon fiber material, for example. A conductive film 82, typically made of aluminum 20 to 50 microns thick, can be laminated to the inside of cover 80. This film serves as a part of the Faraday shielding and is connected to the electrical ground circuit of the detector. Next a compressible layer 84 of material such as foam is placed between top cover 80 and a scintillator 86. Scintillator 86 includes a luminescent phosphor material that emits photons when stimulated with x-rays. The phosphor material provides emitted photons of wavelength within the sensitivity of detector photosensors 12 (FIG. 1). The photodiode array and its associated readout circuitry, as depicted in FIG. 1, are formed on a glass panel 88 underneath scintillator 86. Scintillator 86 is in very close contact with glass panel 88 in order to maintain high optical coupling efficiency. Foam layer 84 above scintillator 86 assures this by compressing it against glass panel 88. Glass panel 88 is relatively fragile and is protected to keep it from fracturing. A thick support layer 90 is therefore laminated to the glass and serves to protect it. Support layer 90 may be aluminum, titanium or magnesium, for example.

Still referring to FIG. 7, aluminum enclosure 92 is also part of the detector's Faraday shield and makes electrical contact with conductive film 82 (such as aluminum foil) on the inside of top cover 80 when all the components are assembled together. There is a fastener or other device provided to securely hold glass support 90 to the back of aluminum enclosure 92. For simplicity, the details of this structure have not been shown here, but would be familiar to those skilled in the electronic device assembly arts.

Figure 2:
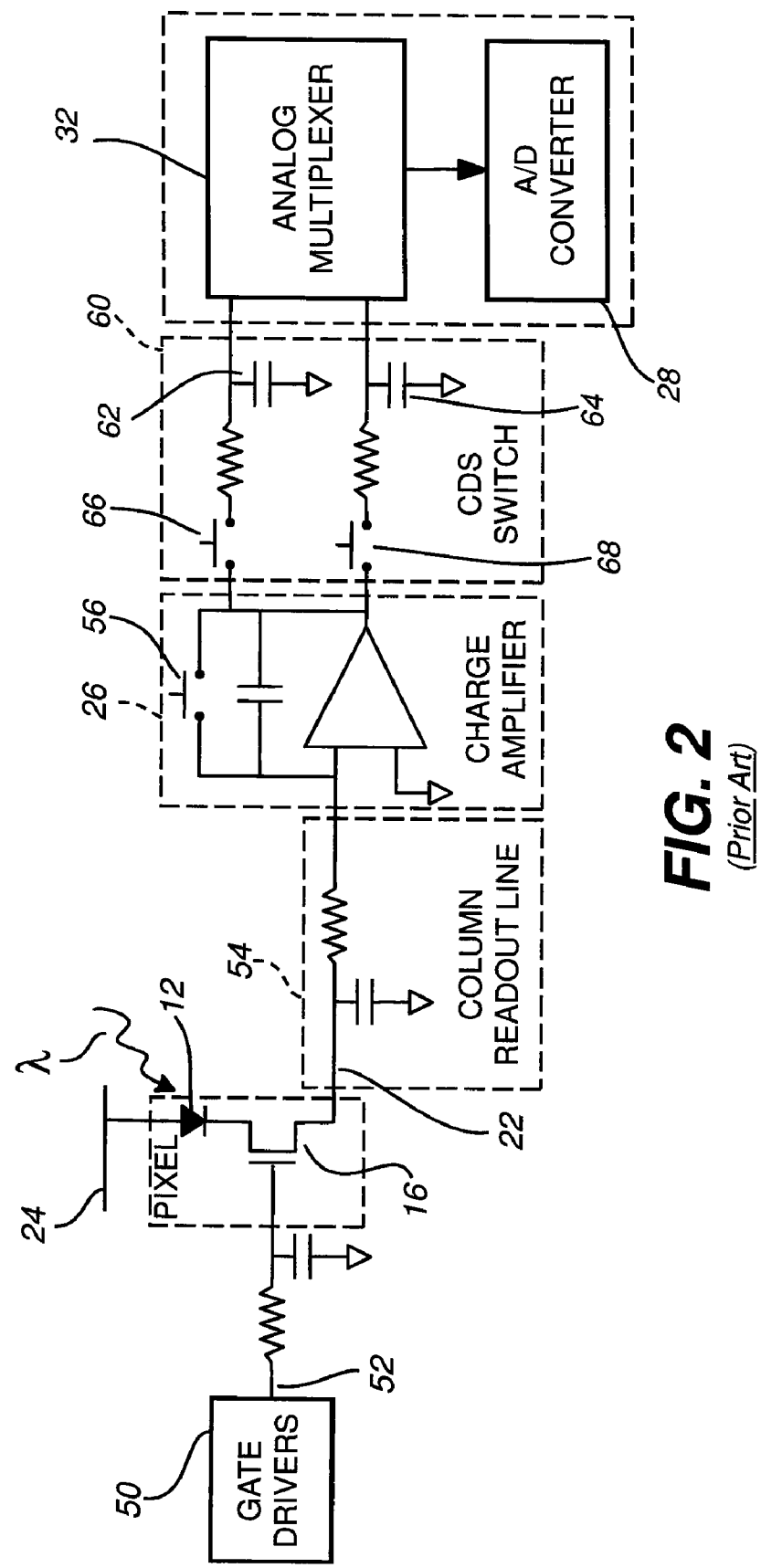
FIG. 2 is a schematic diagram showing a typical signal path for a single photodiode in the radiological image detector.
Figure 3:
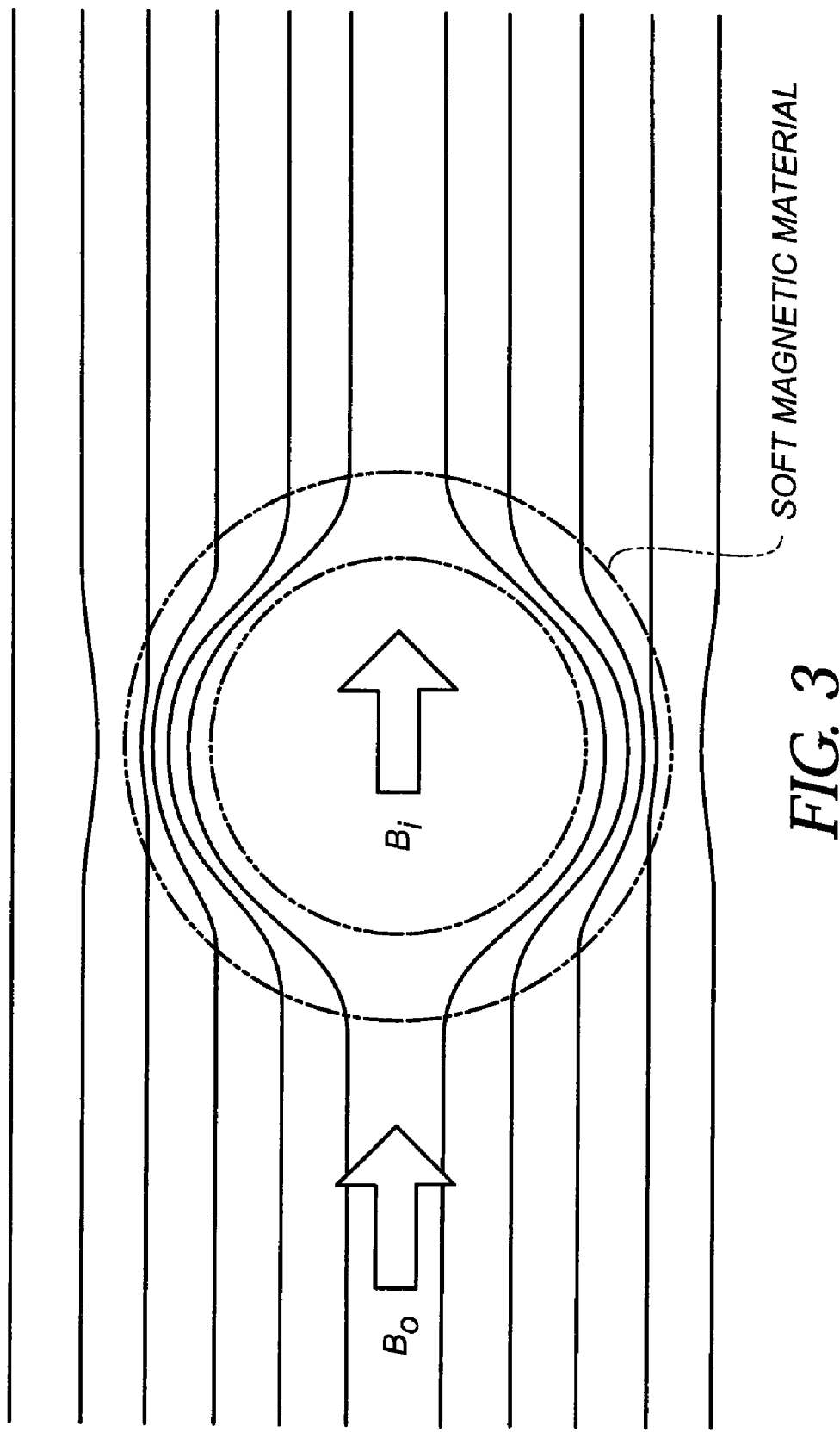
FIG. 3 is a schematic diagram showing the effects of magnetic shielding.
Figure 4:
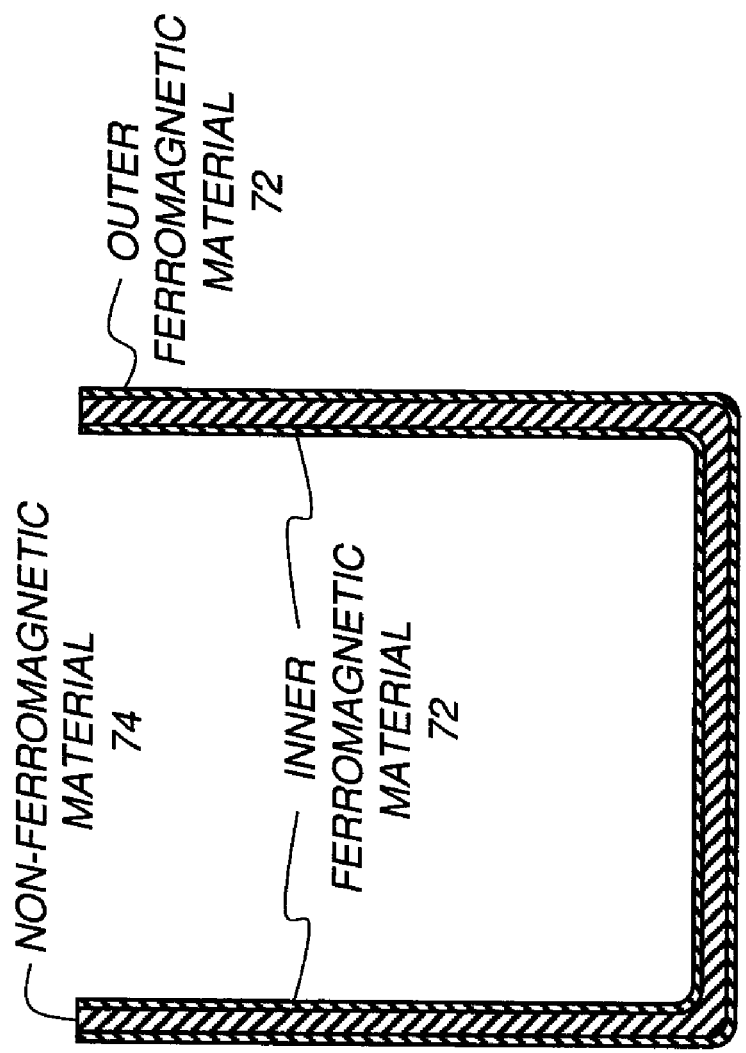
FIG. 4 is a cross-sectional side view of a multi-layer shielding arrangement.
Figure 5:
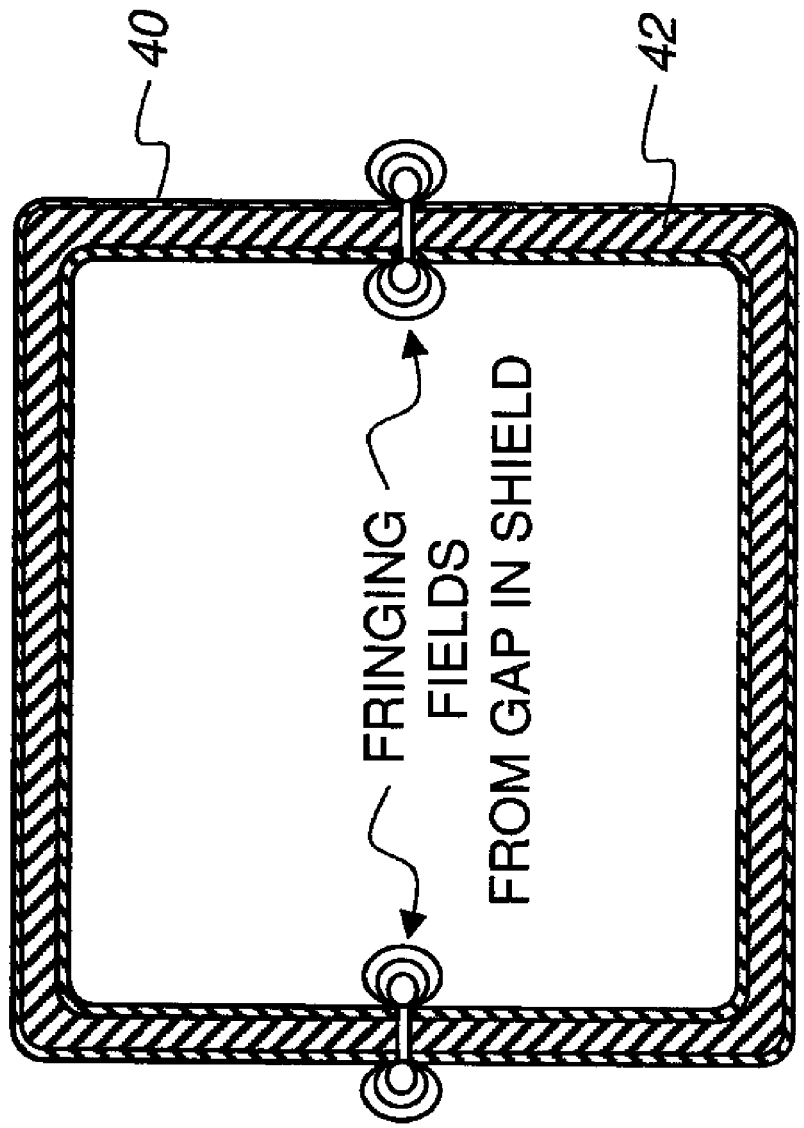
FIG. 5 is a cross-sectional side view of a multi-layer shielding arrangement showing fringe effects.

FIG. 7 also shows three components to the left: a flex cable 94, an Application-Specific Integrated Circuit, ASIC 96 and a circuit board 98. Circuit elements shown in FIGS. 1 and 2, namely the charge amplifiers 26, a multiplexer MUX 32 and the A/D converter circuits 28 are positioned on circuit board 98 of FIG. 6. Some of the circuits, such as the charge amplifiers are located in ASIC 96 itself. Flex cable 94 serves as the connection between column readout lines 22 of FIGS. 1 and 2 on the glass panel and the charge amplifiers in ASIC 96. Flex cable 94 contains high impedance signal lines to all the charge amplifiers in the detector. Given the arrangement of FIG. 7, flex cable 94 and ASIC 96 are, therefore, the components most sensitive to interference from magnetic fields and require some type of shielding.

The apparatus and method of the present invention provide a multi-layered and overlapped shielding arrangement that helps to protect sensitive circuit components and that provides reduced levels of X-ray attenuation, reduced weight over conventional solutions, little or no perceptible increase in detector dimensions, and encasement of DR receiver panel components. To do this, embodiments of the present invention employ multiple shielding materials in an overlapped arrangement that provides an effective shielding solution for portable DR applications. To meet these objectives in various embodiments, different arrangements of materials are used over different surfaces of enclosure 92 and its top cover.

Figure 8A:
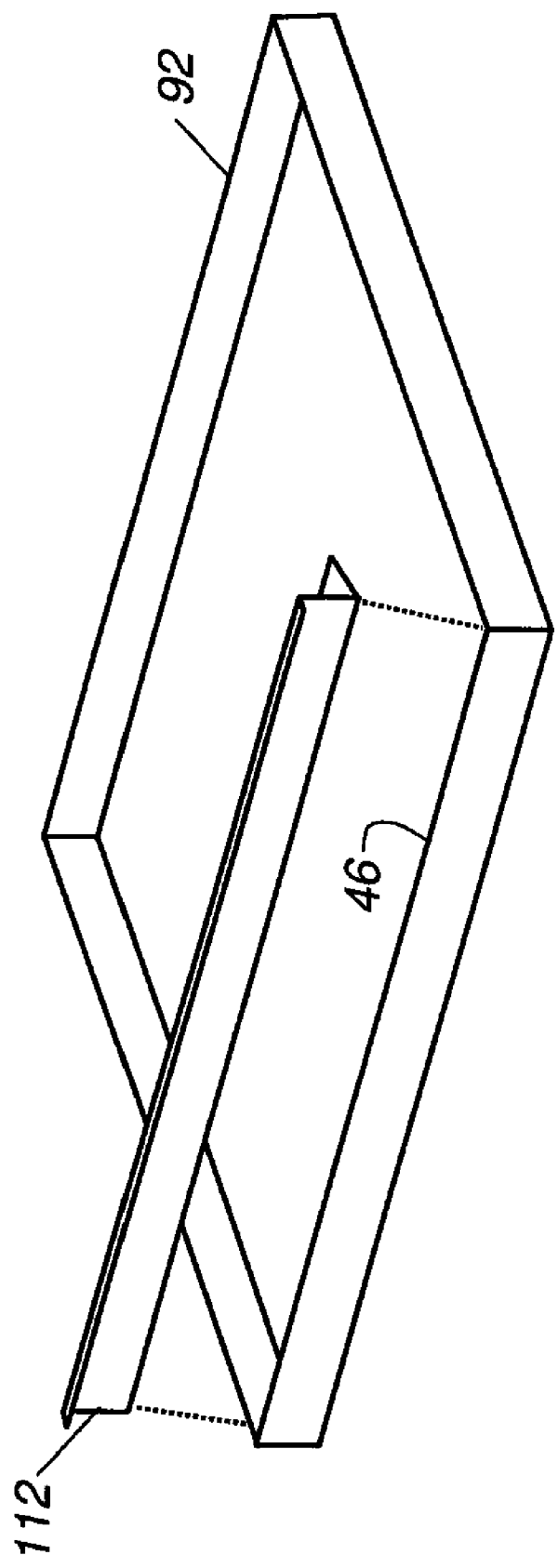
Figure 8C:
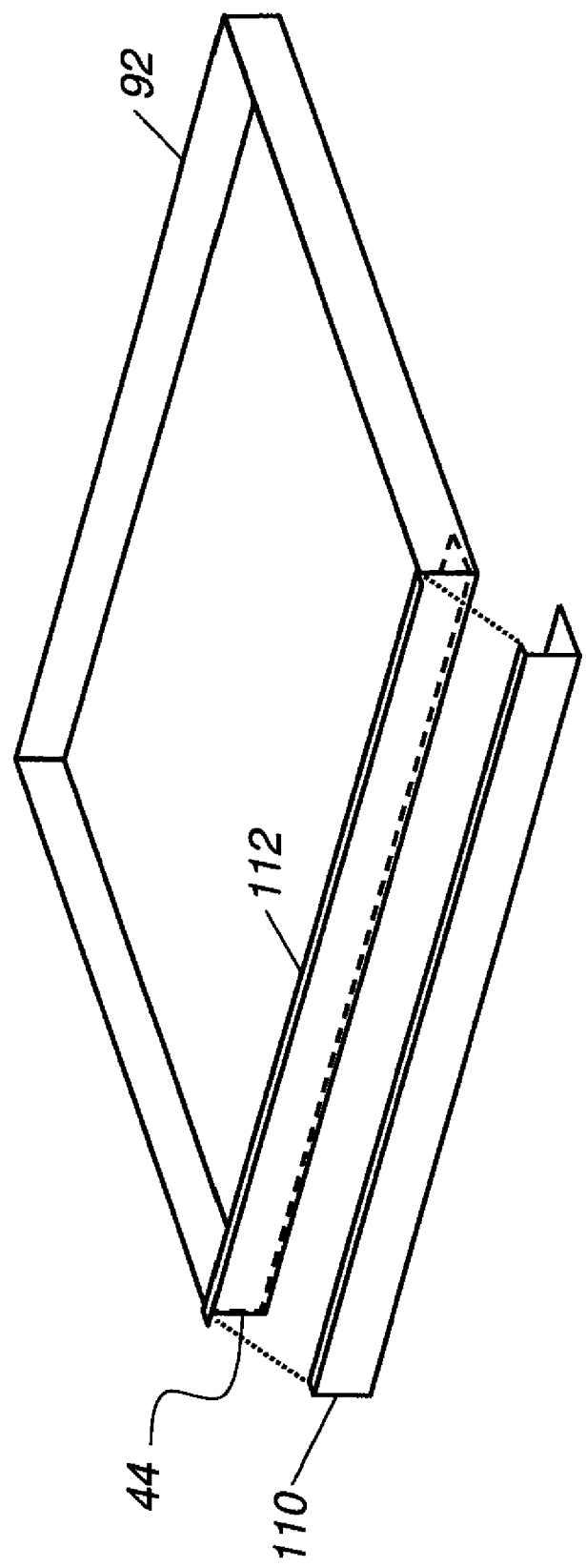
Figure 8D:
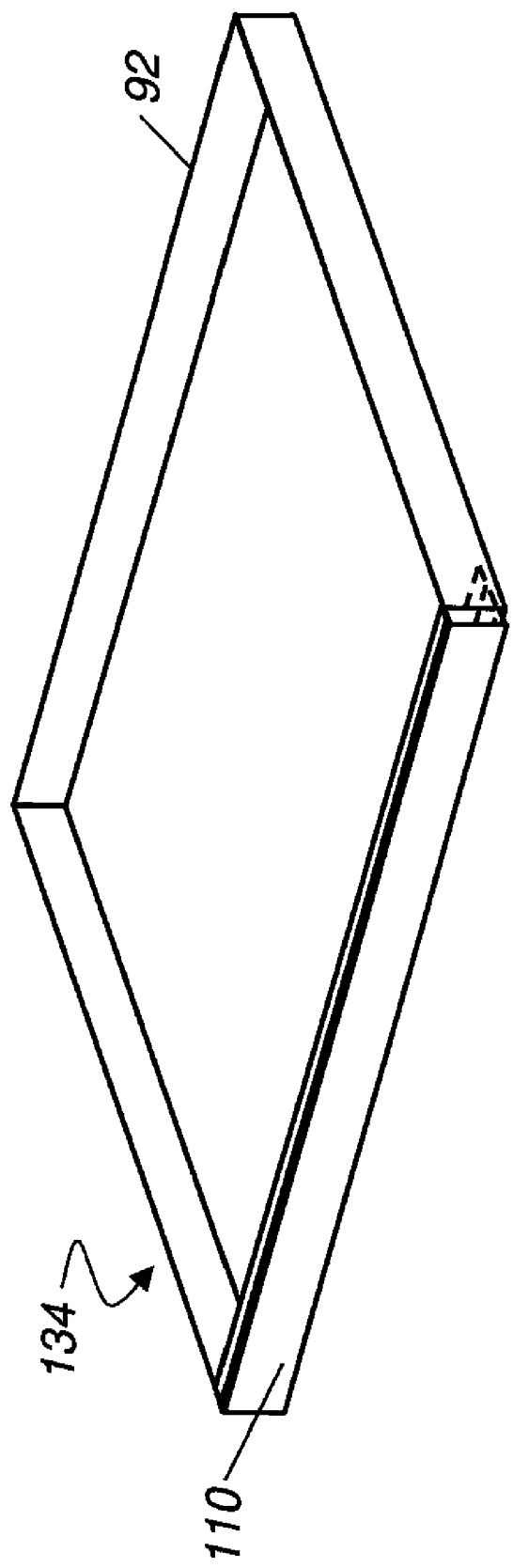
Figure 8E:
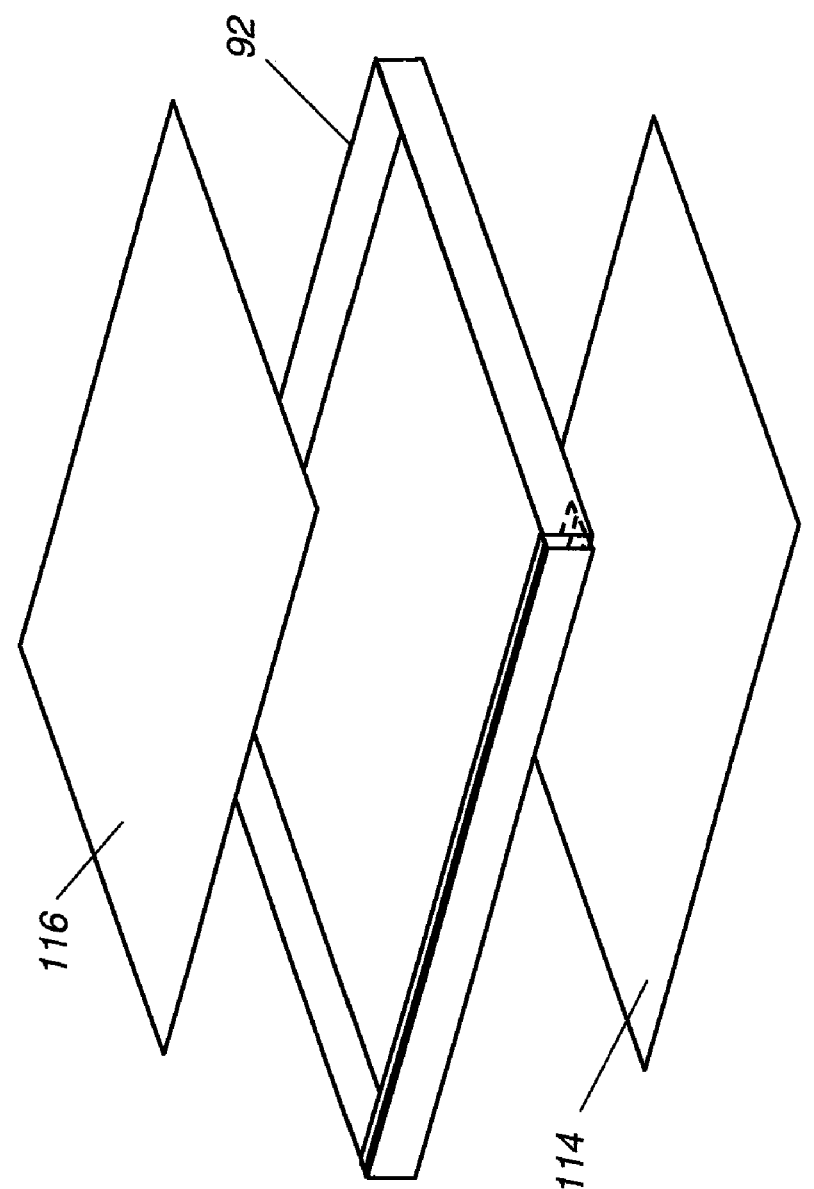
Figure 8F:
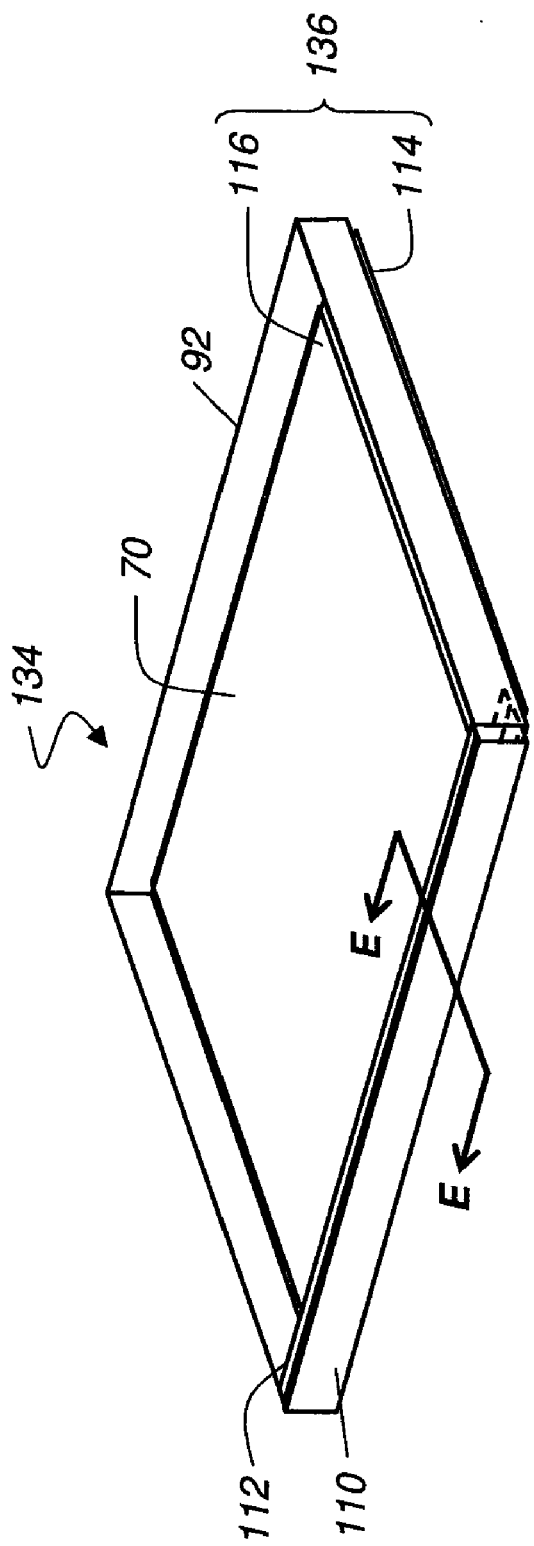

The partial assembly sequence of FIGS. 8A through 8F shows how multiple pieces of shielding material are layered over various surfaces of enclosure 92 in one embodiment. Referring to FIGS. 8A and 8B, a first shield segment 112 is formed from '0.002 Mu' which represents Mu metal with thickness of 2 mils. In order to form an inner side wall layer, shield segment 112 is applied to one inner side wall 46 of enclosure 92, folded to extend along a portion of the perimeter of enclosure 92 along inner side wall 46 and also folded to extend along the top edge of the side walls. As FIGS. 8C and 8D show, a similar process optionally applies a shield segment 110 to outer side wall 44, overlapping shield segment 112 and forming a side wall magnetic shield 134 that extends along at least one surface of a side wall thereby. FIGS. 8E and 8F then show application of shield segments 116 and 114 to top and bottom surfaces of enclosure 92, overlapping the edges of shield segments 110 and 112. FIG. 8F shows the shielded enclosure 92, having, on inner and outer surfaces of base 70, shield segments 116 and 114 respectively, forming a base magnetic shield 136 that extends across at least one of the inner and outer base surface thereby, coupled with sidewall magnetic shield 134 of FIG. 8D.

Figure 9A:
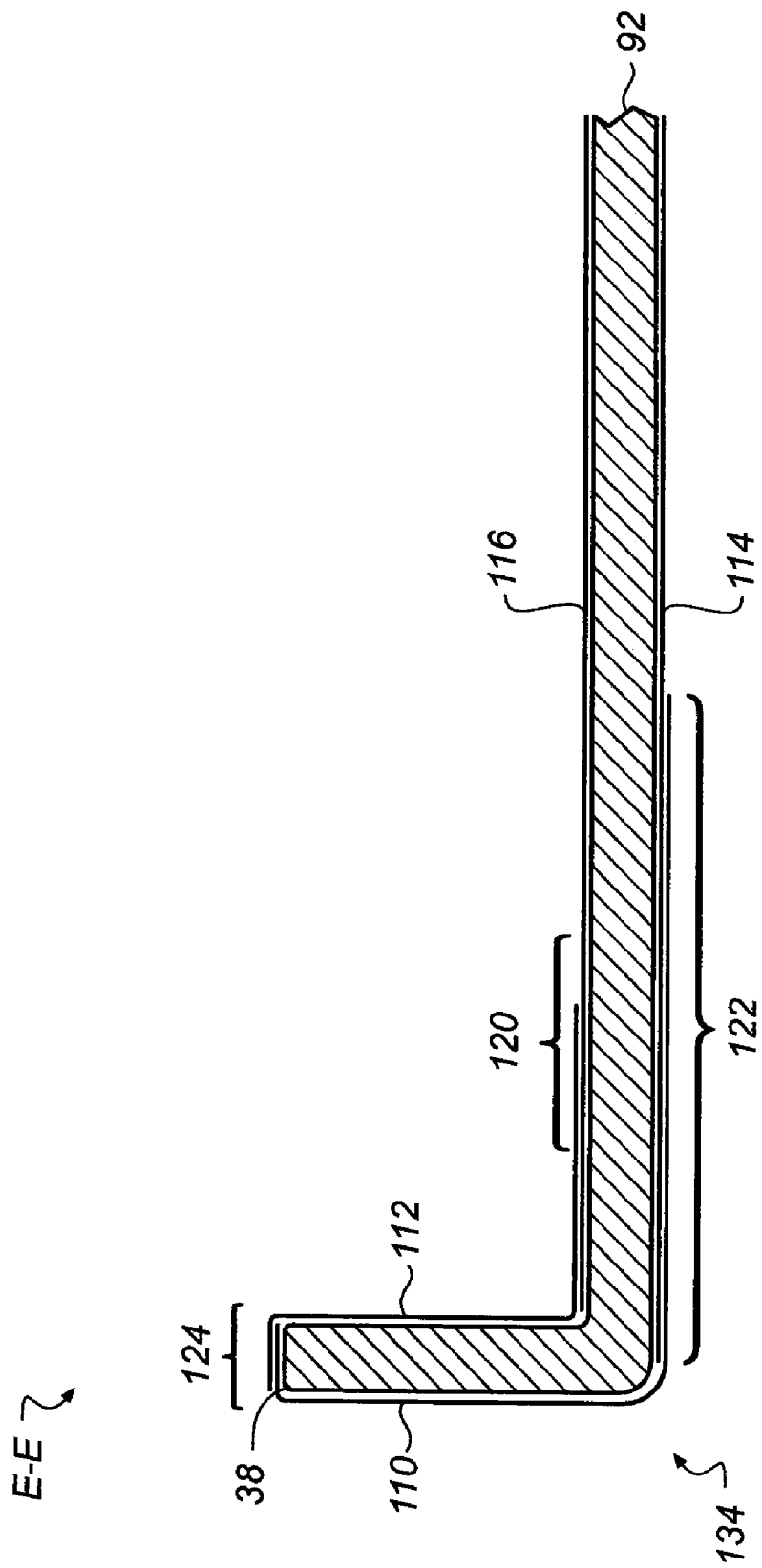
FIG. 9A is a cross-sectional side view of a shield arrangement for a DR detector in one embodiment of the present invention.

The cross-sectional view of FIG. 9A shows the overlapped arrangement of layers of shielding materials used for the embodiment of FIGS. 8A through 8F. Different magnetic materials are shown laminated or applied in combination to inner and outer surfaces with this embodiment. In FIG. 9A, a first material is '0.002 Mu' which represents Mu metal with thickness of 2 mils, that is, 0.002 inches, is used to form shield segments 110 and 112. A second material, forming shield segments 114 and 116, uses an applied layer of nanocrystalline material with soft magnetic properties, such as FINEMET® from Hitachi Metals, HK.

Figure 9B:
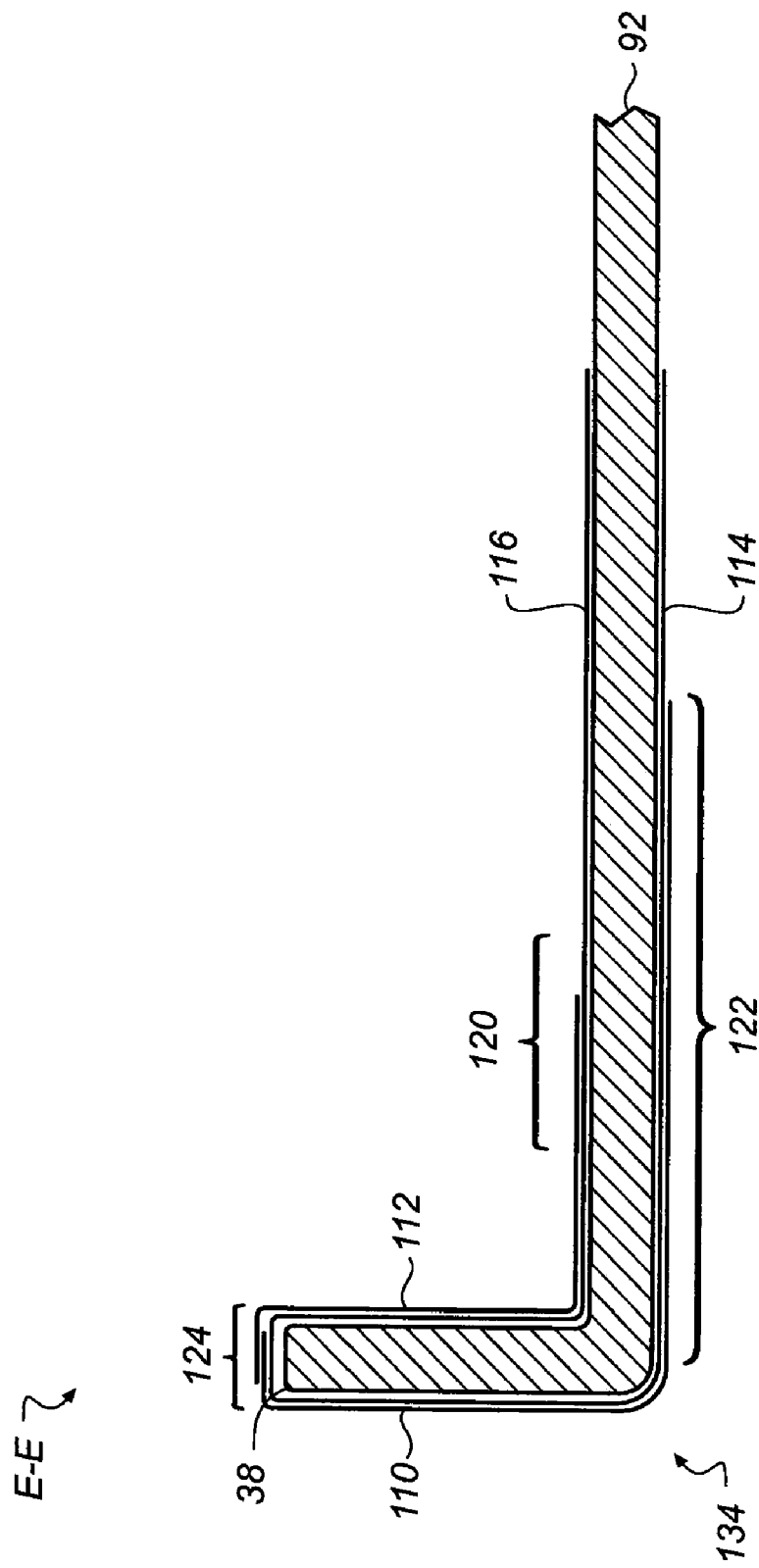
FIG. 9B is a cross-sectional side view of an alternate embodiment of a shield arrangement for a DR detector.

FIGS. 9B and 9C show shielding application in alternate embodiments, again using sectioned side views for one edge of the DR detector 104 (view E-E from FIG. 6). In FIG. 9B, electrodeposition is used for EMI shielding. An electrodeposited layer of nanocrystalline iron-nickel alloy provides shield segments 116 and 114 and continues up inner side wall 46 along edge 38 and also along outer side wall 44. This continuous coated shielding is then supplemented along edges of enclosure 92 by shield segments 112 and 110 of '0.002 Mu' that overlap where they intersect and also overlap shield segments 114 and 116 where they are applied.

In the alternate embodiment of FIG. 9C, a direct electrodeposited layer of nanocrystalline iron-nickel alloy serves as a first magnetic material for shield segments 110 and 112 and replaces a first magnetic material of '0.002 Mu'. A second material, forming shield segments 114 and 116 uses a layer of nanocrystalline sheet material such as FINEMET®. Alternately, shield segments 114 and 116 can use additional layers of direct electrodeposited nanocrystalline iron-nickel alloy forming continuous shield segments from 112 to 116 and from shield segments 110 to 114, as in the FIG. 9B embodiment. One or more layers of nanocrystalline material in sheet form could also be applied onto an electrodeposited layer in another embodiment.

The use of different shielding materials overlaid and applied in this way helps to improve the manufacturability, weight and cost of the DR receiver panel as well as to improve its magnetic shielding performance. A 2 mil Mu metal layer has both good magnetic properties and reduced weight over thicker Mu metal, with good performance. Each piece of a first shielding material, '0.002 Mu', can be adhered to aluminum enclosure 92 using double-sided pressure-sensitive adhesive tape. A second shielding material is adhered to aluminum enclosure 92, as in the case of a nanocrystalline material in sheet form, using double-sided pressure sensitive adhesive tape.

The interface between each shield segment and its adjacent shield segment is an overlap region as shown in FIGS. 9A through 9C. FIGS. 9A and 9B show overlap region 1, labeled 120, where an inner shield segment 112 of Mu metal overlaps with its neighboring shield segment 116 of nanocrystalline material. Also shown in FIGS. 9A and 9B is an overlap region 2, labeled 122, wherein an outer shield segment 110 of Mu metal overlaps with its neighboring shield segment 114 of nanocrystalline material.

FIG. 9C shows overlap region 1, labeled 120, wherein inner shield segment 112 of electrodeposited nanocrystalline iron-nickel alloy overlaps its neighboring shield segment 116 of nanocrystalline material consisting of nanocrystalline material. Alternatively, in overlap region 2, labeled 122, an inner shield segment 112 of electrodeposited nanocrystalline iron-nickel alloy overlaps its neighboring shield segment 114 of nanocrystalline material. In the case where inner shield segment 110 and inner shield segment 112 both consists of electrodeposited nanocrystalline iron-nickel alloy there is no overlap region; with electrodeposition, the nanocrystalline iron-nickel alloy forms a continuous surface. The overlap regions as implemented are necessary to reduce the amount of field fringing, as described earlier.

As shown in embodiments using '0.002 Mu' shielding, inner and outer shield segments 112 and 110 of Mu metal exist as separate pieces. This is a practical arrangement since bending and adhering a single piece of material around the side edge of aluminum enclosure 92 is generally impractical from a manufacturing standpoint. Broad flat areas of the outside and inside surface of enclosure 92 are then covered with layers of either sheet shielding material such as FINEMET® or electrodeposited iron-nickel alloy nanocrystalline material.

Nanocrystalline material such as FINEMET® provides high permeability but has only about 57 percent of the weight of Mu metal. In addition, FINEMET® material, laminated between plastic sheets, is cheaper and is easier to handle than Mu metal. In the case of nanocrystalline iron-nickel alloy, the added weight is substantially the same as Mu metal for the same thickness, but application of the material by direct electrodeposition provides a layer of high permeability with improved manufacturability, particularly with the complex geometries noted earlier in the structure of the aluminum enclosure 92. The shielding arrangements of FIGS. 9A-9C thus provide substantially continuous magnetic shielding using different types of magnetic material with overlapping regions, optimizing weight, cost and manufacturability.

Figure 10A:
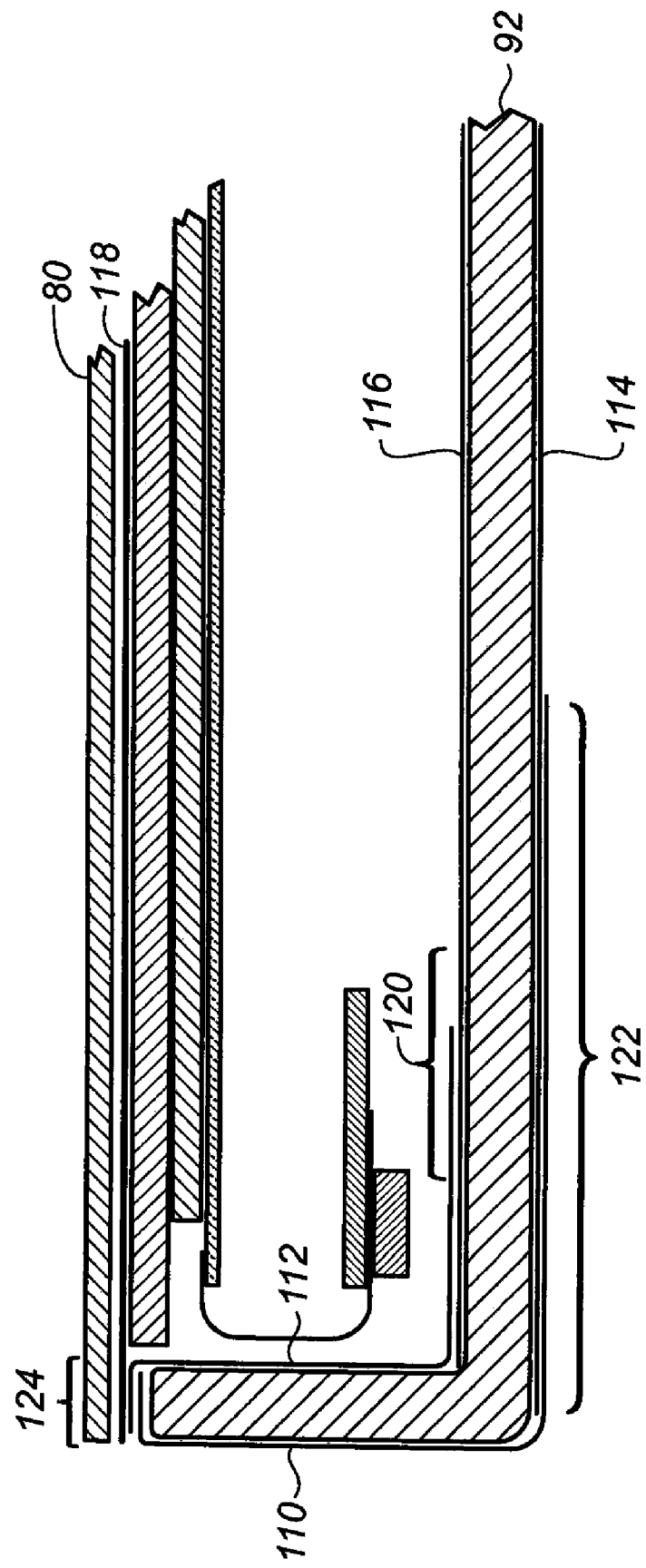
FIG. 10A is a cross-sectional side view of an embodiment using a shield arrangement for a DR detector with a shielded cover.

An assembled DR detector with complete magnetic shielding is shown in FIG. 10A. Adhered to the inside surface of the top cover is a shield segment 118, a layer of Mu metal nominally 0.001 inch thick forming a cover magnetic shield in one embodiment. For effective EMI protection, shield segment 118 contacts and overlaps the other layers of Mu metal of shield segments 110, 112 in overlap region 124 that cover the side walls of aluminum enclosure 92, in order to reduce or prevent fringing that can occur at a shield discontinuity. To reduce X-ray absorption, the Mu metal used as shield segment 118 is preferably as thin as possible, but of sufficient thickness to provide adequate shielding. Using 1 mil Mu metal achieves the required magnetic shielding effect for the cover magnetic shield while reducing x-ray absorption and allowing for manufacturability.

Figure 10B:
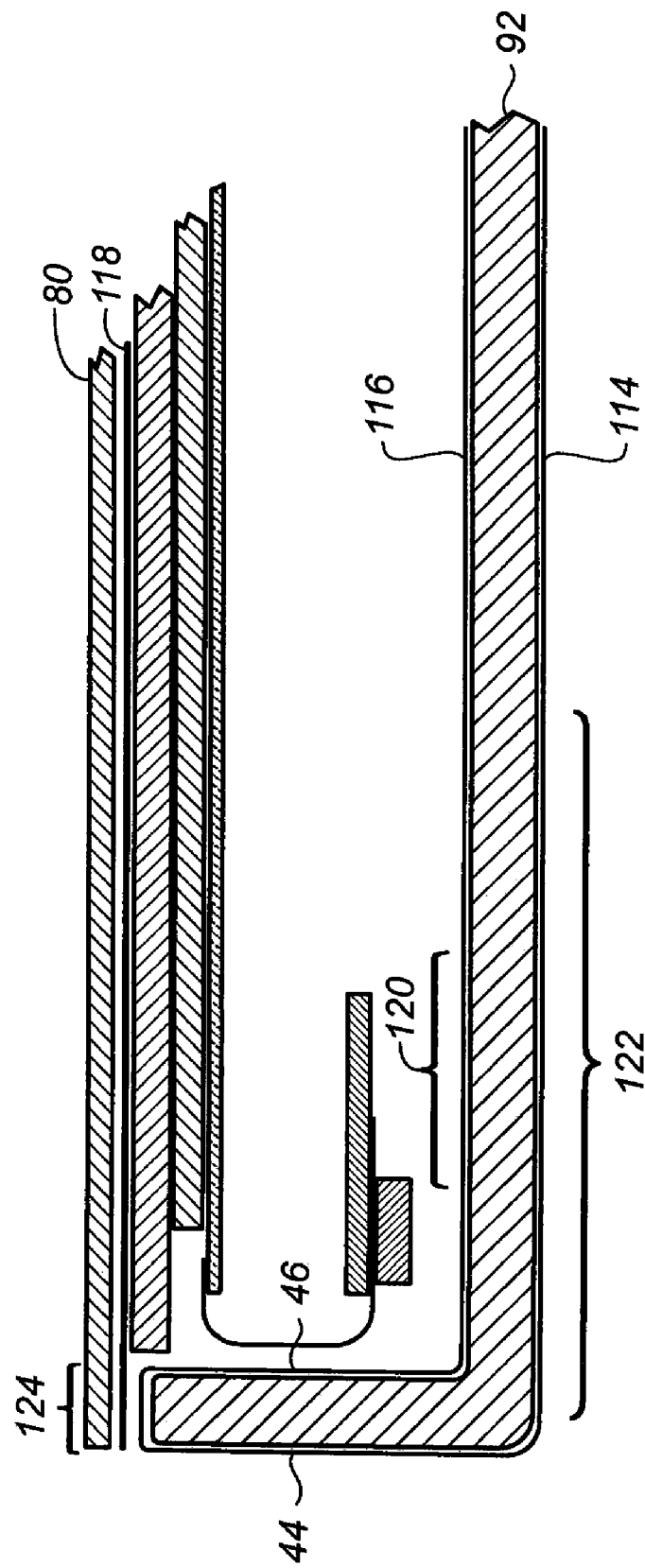
FIG. 10B is a cross-sectional side view of another embodiment of a shield arrangement for a DR detector with a shielded cover.

An alternate embodiment of the assembled detector with complete shielding is shown in FIG. 10B. Here, a layer of Mu metal, nominally 0.001 inch thick is also provided and adhered to the inside surface of the top cover shield segment 118. In this embodiment, layers of nanocrystalline iron-nickel alloy are applied to inner side wall 46 and to outer side wall 44 by pulsed electrodeposition instead of 0.002 Mu metal as shown in FIG. 10A. In similar manner to the embodiment of FIG. 10A, shield segment 118 contacts and overlaps the other layer of nanocrystalline iron-nickel alloy of shield segments 110, 112 in overlap region 124 that covers the side walls of aluminum enclosure 92, in order to reduce or prevent fringing that can occur at a shield discontinuity.

Because it is electrically conductive, shield segment 118 can also serve as part of the Faraday shielding for higher frequency EMI compensation. This eliminates the need for conductive film 82 that was shown in FIG. 7. If aluminum enclosure 92 is electrically connected to the DR detector's circuit ground, then a ground connection is also established at the Mu metal interface in overlap region 124 as long as there is no adhesive or other non-conductive material along the top edge.

Mu metal is composed of iron and nickel, both good electrical conductors. However, over time, there is the chance that oxides may form, increasing the contact resistance between the different layers of Mu metal and aluminum at the interface in overlap region 124. To overcome this problem and to reduce ohmic resistance at this interface due to corrosion, the Mu metal can be plated with a thin layer of electro-less nickel.

The shielding arrangement shown for one edge of DR detector 104 in FIG. 10A or 10B would be extended to the full surface area of DR detector 104, including both enclosure 92 and cover 80. At each interface of adjacent shield segments, an overlap would be provided as was shown in FIGS. 9A-9C and 10A or 10B.

Figure 11:
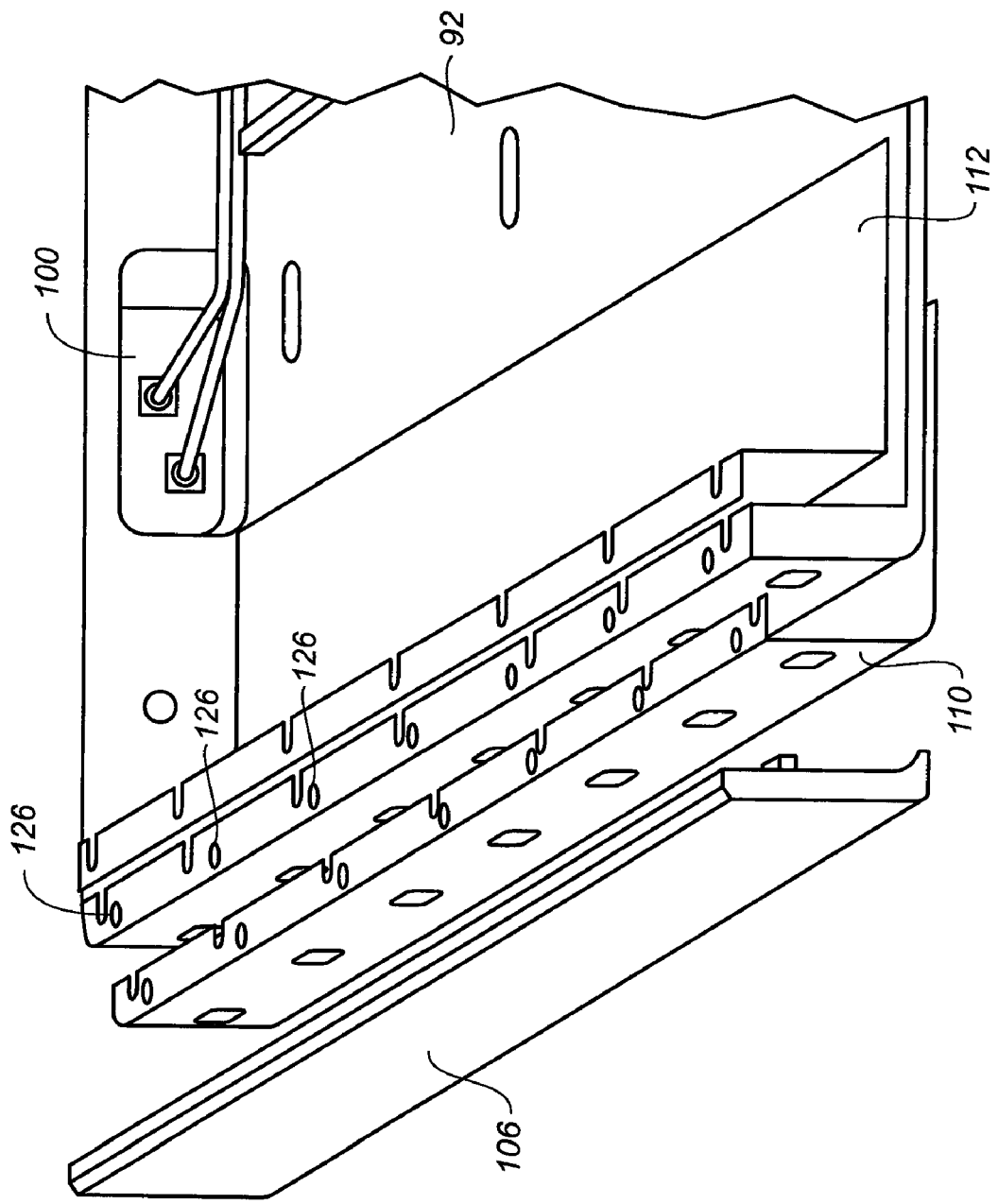
FIG. 11 is a perspective exploded view showing an edge of an enclosure for a DR detector, with shield materials for side walls shown.

The perspective view of FIG. 11 shows, in a partially exploded view, how the Mu metal of shield segments 110 and 112 are fitted together along with an external protective bumper 106 in one embodiment. Tapped holes 126 drilled in enclosure 92 are matched with corresponding perforations in shield segments 110 and 112. Screw holes 126 are used in order to mount cover 80 and to complete the packaging of DR detector 104. Bumper 106 serves as a drop shock protection device for the detector. It also serves as a protective cover for the exposed Mu metal shield segment 110 on the outside edges. This particular arrangement can be used on all four edges of the detector housing with slight modifications in areas where unique features of the detector were located. (For clarity, nanocrystalline material shield segments 114, 116 are not shown in this view.)

Figure 12:
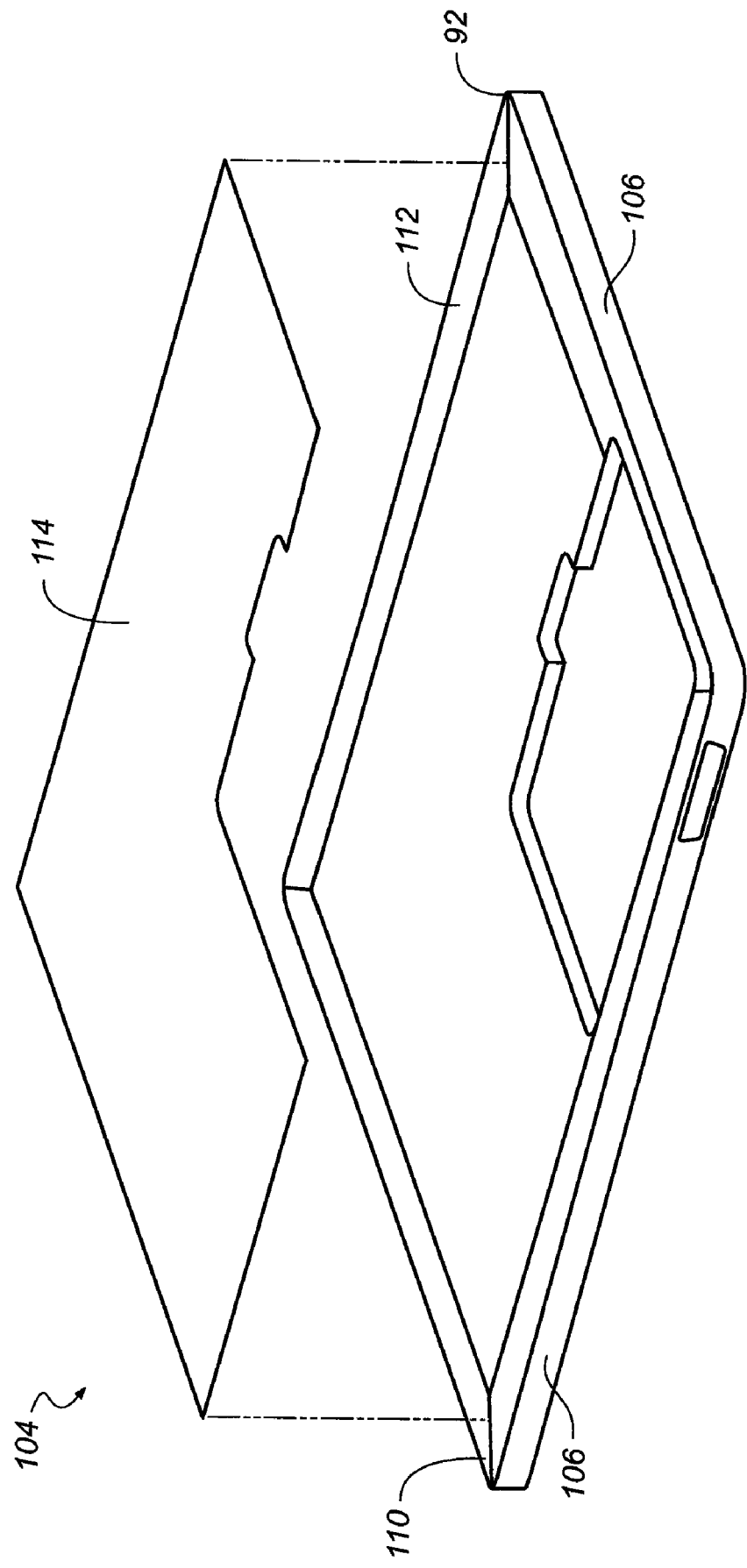
FIG. 12 is a perspective exploded view from the rear of a DR detector having layered shielding according to one embodiment.

The perspective view of FIG. 12 shows the back of DR detector 104 and illustrates the arrangement of external shielding from this view. External Mu metal edge shields are cut at a 45 degree angle in order to meet at adjacent edges, forming a structure similar to a picture frame when assembled. The nanocrystalline material is then applied to the back surface of aluminum enclosure 92, overlapping all the Mu metal edge shields. All of the shielding material is adhered to aluminum enclosure 92 with suitable pressure sensitive adhesive or, in the case of the nanocrystalline iron-nickel alloy, through the process of direct pulsed electrodeposition. Elastomer bumper 106 is then wrapped around the outside edges and affixed with another layer of PSA.

Fabrication, Adhesion Procedures

Although the shielding arrangement described with reference to FIGS. 8A-12 can provide a substantially continuous EMI shield about DR detector 104, there can be formidable manufacturing problems for obtaining this shielding arrangement with embodiments that apply different layers of Mu metal and nanocrystalline sheet materials. For providing shield segments 110 and 112, for example, the job of handling and accurately adhering thin, 2 mil Mu metal foil strips with proper alignment can be particularly troublesome and error-prone. If PSA is used, for example, the foil shapes are accurately bent after a layer of PSA has been laminated onto it. At the time of assembly, the top protective layer of the PSA is carefully peeled back to expose the sticky surface. This operation alone incurs significant risk for damaging the foil. Further, once the adhesive layer has been exposed, the bent foil is correctly aligned to aluminum enclosure 92 as it is pressed into place. Any accidental misalignment of the foil at adhesive contact can easily ruin the foil segment and require time-consuming rework and cleanup. This significantly impacts the feasibility of providing magnetic shielding to DR detector 104.

To overcome these difficulties, one embodiment of the present invention provides a support layer for the thin, delicate Mu foil. This support layer forms a protective backing for the foil during storage and aids in the alignment and application of the foil to sides of the enclosure 20 housing.

Figure 13:
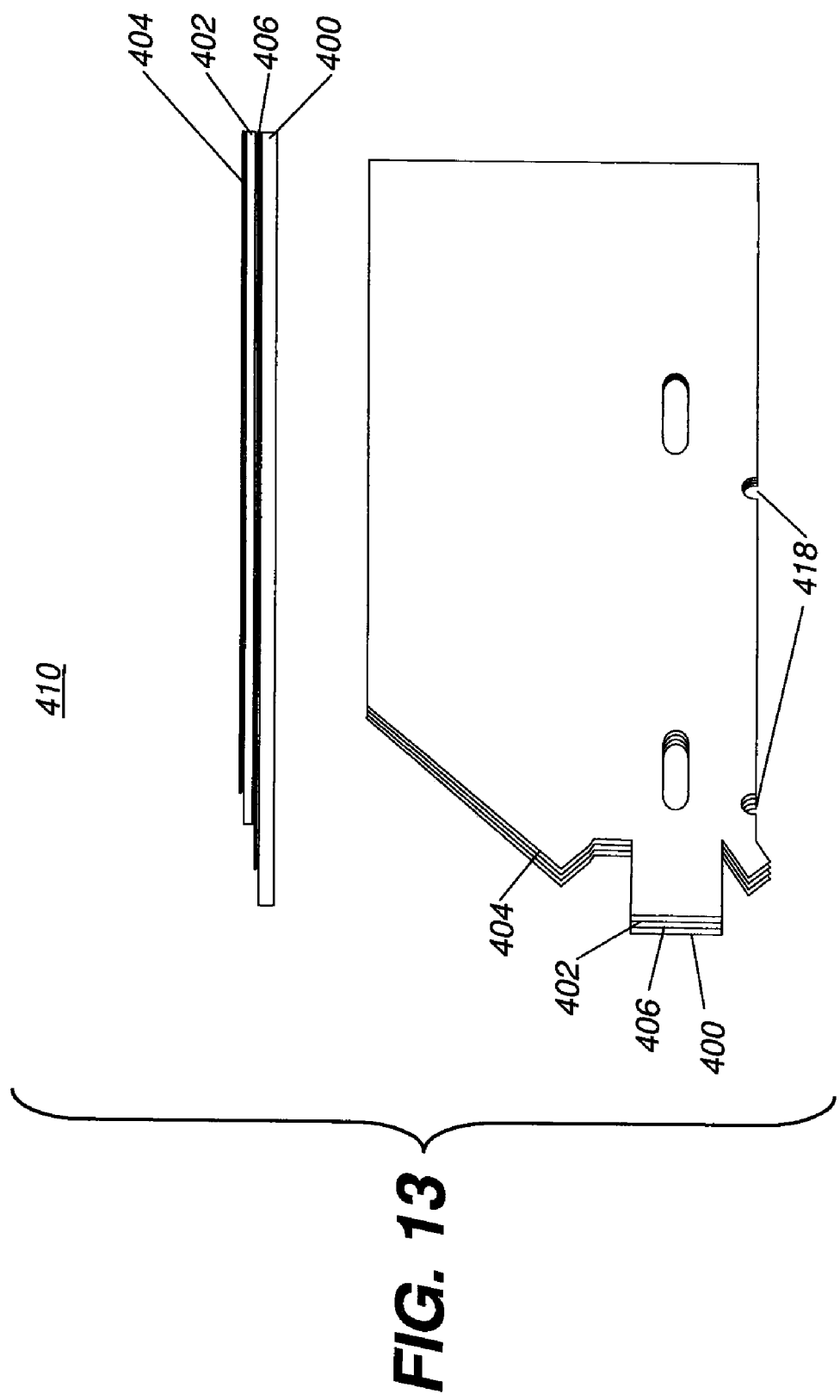
FIG. 13 shows side and plan views of a backing assembly for shield mounting.

The side and top views of FIG. 13 show an edge portion of a foil application apparatus 410 that provides a support backer 400 for a layer of metal foil 402 that will be used to form shield segments 110 or 112 as described earlier. In one embodiment, support backer 400 consists of a sheet of 15 mil stainless steel that provides a rigid backing, allowing protruding features to be readily handled with reduced likelihood of damage. Layered on top of this is an adhesive sheet 406 of double sided PSA. In one embodiment, the top and bottom surfaces of adhesive sheet 406 have different adhesive characteristics. The bottom surface of adhesive sheet 406 that is in contact with support backer 400 is a relatively high-tack adhesive. The opposite surface that contacts the next layer above is a relatively low-tack adhesive that adheres to the layer of foil 402. This low-tack layer is chosen to allow the foil layer 402 to be easily separated from support backer 400 during final assembly. An adhesive layer 404 is another sheet of PSA with high-tack adhesive on both inner and outer surfaces. This PSA layer serves as the adhesive layer that ultimately fastens the Mu foil to the aluminum housing of enclosure 92. Not shown is an additional protective cover temporarily applied over the top surface of this layer of PSA; this cover is peeled off at the time of final assembly. Alternatively, PSA layer 404 may be omitted from the sandwiched structure and applied directly to a surface of an outer side wall of the enclosure to adhere the foil layer to the enclosure at the time of application. For ease of application, this sandwiched structure of foil application apparatus 410 is then cut to the desired pattern for being applied to enclosure 92. This operation can be done using a number of different techniques, such as laser cutting, for example. Slots 418 and other features may be used to help with the alignment of foil application apparatus 410.

Figure 14:
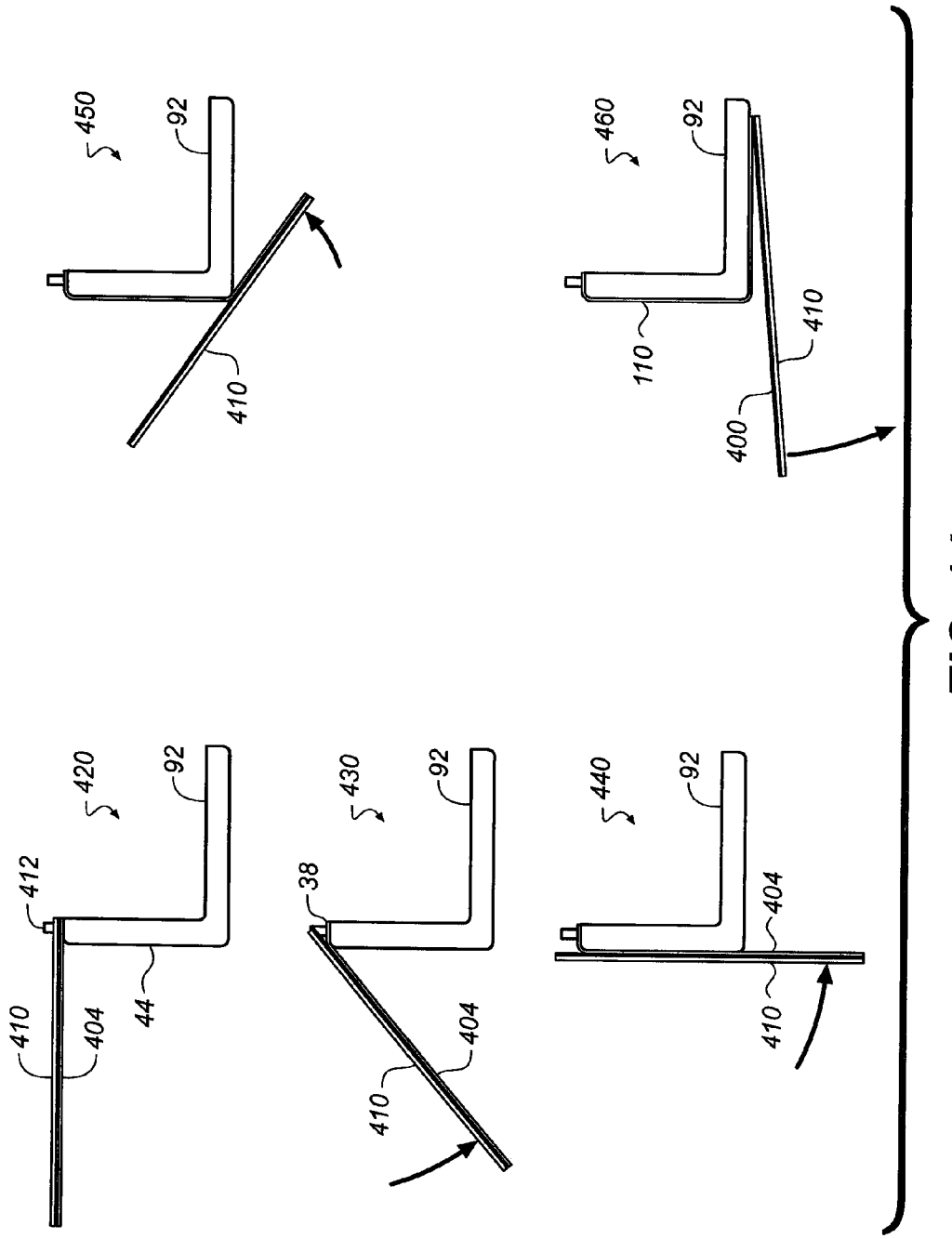
FIG. 14 shows a sequence of steps for adhering a side wall shield to an enclosure.

FIG. 14 shows a sequence for applying shield segment 110 to outside wall 44 of enclosure 92 in one embodiment. Before this sequence begins, the temporary protective cover over adhesive layer 404 is removed. In an initial alignment step 420, alignment pins 412, seated in tapped holes, help to provide initial positioning of foil application apparatus 410 and adhesion along the top edge surface is obtained. In wrapping steps 430 and 440, foil application apparatus 410 is pivoted about the top edge to adhere the metal material to the outside surface. As the foil application apparatus 410 sandwich is bent around top edge 38, low-tack adhesive sheet 406 releases the Mu foil from the stainless steel backer. At the same time, high-tack adhesive layer 404 at the foil-housing interface holds fast. In steps 450 and 460, foil application apparatus 410 pivots about the lower corner of the enclosure 92 edge in order to adhere shield segment 110 along the bottom surface. Care is used in bending and folding at each step, to keep foil application apparatus 410 aligned and held firmly against the housing, preventing buckling or air pockets. When the final area of foil application apparatus 410 is pressed against the enclosure 92, support backer 400 can be completely separated from the enclosure 92 housing and discarded.

As shown in FIG. 15, shield segment 112 is pre-shaped to conform to inside surface bends and is applied using a fixture approach. In this embodiment, a double-sided PSA 132 is applied to the inner surface along the edge of enclosure 92, so that an alignment tool 130 can be slid directly into place, guided by alignment pins 412 that are in top edge 38. The overlapping fold at overlap region 124 (FIG. 10A) can be provided as a final step, such as by removing alignment pins 412 and using the edge of alignment tool 130.

With Mu metal shield segments 110 and 112 affixed in place, the flat shield segments 116 and 114 can then be applied, as shown earlier in FIG. 8E. Cover 80 can then be attached to enclosure 92 following installation of the internal components of DR detector 104.

One further complication for EMI shielding relates to the need for external openings that allow cable connections, signal transmission, fasteners, and the like. For example, FIG. 11 shows an access port 100 in enclosure 92 that cannot be easily covered using any type of shield material. To compensate for this inherent problem, embodiments of the present invention apply a shielding coating to the surface of enclosure 92 following its initial fabrication and prior to application of shield materials. In one embodiment, this is an electrodeposited coating having a thickness of 0.001 inches and consisting of approximately 80% nickel and 20% iron, with small amounts of other metals, such as cobalt.

The invention has been described in detail with particular reference to a presently preferred embodiment, but it will be understood that variations and modifications can be effected within the spirit and scope of the invention. For example, intersections between surfaces can be at some angle other than 90 degrees, as shown for exemplary embodiments. Various types of adhesives can be used in addition to or instead of the PSA materials described herein. For example, a heat-activated, heat-cured, epoxy, or other adhesive could be used for one or more of the fabrication steps, allowing more flexibility and tolerance for error in initial alignment of foil parts to the enclosure. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10. Imaging panel
12. Photosensor
14. Pixel
16. Transistor
18. Driver
20, 22. Readout line
24. Bias line
26. Amplifier
28. Analog-to-digital converter
30. Signal bus
32. Multiplexer
34. Bias supply
36. Corner
38. Edge
40. Cover section
42. Base section
44, 46. Wall
50. Gate driver
52. Signal path
54. Equivalent circuit
56. Switch
60. CDS switch
62, 64. Capacitor
66. Switch
68. Switch
70. Base
72. Material
74. Non-ferromagnetic material
80. Cover
82. Film 84. Layer
86. Scintillator
88. Glass panel
90. Support layer
92. Enclosure
94. Cable
96. ASIC
98. Circuit board
100. Access port
104. DR detector
106. Bumper
126. Hole
110, 112. Shield segment
114, 116. Shield segment
118. Shield segment
120, 122, 124. Overlap region
130. Tool
132. PSA
134. Side wall magnetic shield
136. Base magnetic shield
400. Support backer
402. Foil
404. Adhesive layer
406. Adhesive sheet
410. Foil application apparatus
412. Alignment pin
418. Slot
420, 430, 440, 450, 460. Step

What is claimed is:

1. A digital radiographic detector comprising:
a detector panel forming digital image data according to radiation exposure energy;
an enclosure housing the detector panel, the enclosure formed from an electrically conductive material without a magnetic shielding capability and having a base with an inner base surface and an outer base surface and having, along its perimeter, one or more side walls that extend orthogonally from the inner base surface;
a base magnetic shield that extends as a layer of nanocrystalline material across at least one of the inner base surface and the outer base surface of the enclosure;
a cover formed from a non-conductive material and comprising a cover magnetic shield of a layer of a metallic alloy bonded to an inner surface of the cover, wherein the cover magnetic shield has a reduced thickness relative to the enclosure to pass more x-rays than the enclosure; and
an additional magnetic shield that extends along one or more surfaces of the enclosure, wherein the additional magnetic shield is the nanocrystalline material and the metallic alloy provided at portions of the enclosure to protect selected components of the detector panel.

2. The digital radiographic detector of claim 1 wherein the nanocrystalline material is electrodeposited to one or more surfaces.

3. The digital radiographic detector of claim 1 wherein the nanocrystalline material is adhesively bonded to one or more surfaces.

4. The digital radiographic detector of claim 1 wherein at least one intersection between the metallic alloy and the nanocrystalline material is an overlap.

5. The digital radiographic detector of claim 1 wherein the cover magnetic shield is a foil of less than 0.002 inch or 0.05 mm thickness, or wherein the additional magnetic shield is a metal foil of less than 0.005 inch or 0.127 mm thickness.

6. The digital radiographic detector of claim 1 wherein the base magnetic shield and the additional magnetic shield reduce magnetic field frequencies below 100 kHz.

7. The digital radiographic detector of claim 1 wherein the nanocrystalline material comprises a nickel-iron alloy, or wherein the metallic alloy is a nickel-iron alloy foil.

8. The digital radiographic detector of claim 1 wherein the additional magnetic shield is continuous with at least one portion of the base magnetic shield.

9. The digital radiographic detector of claim 1 wherein both the metallic alloy and the nanocrystalline material have a relative magnetic permeability, at 1 kHz, of at least 2500 or greater.

10. A digital radiographic detector comprising:
a detector panel forming digital image data according to radiation exposure energy;
an enclosure housing the detector panel, the enclosure formed from an electrically conductive material with a limited magnetic shielding capability and having a base with an inner base surface and an outer base surface and having, along its perimeter, one or more side walls that extend orthogonally from the inner base surface;
a first magnetic shield encasing the enclosure and that comprises one or more segments of nanocrystalline material; and
a cover formed from a non-conductive material and comprising a second magnetic shield of a metallic alloy that extends to overlap a portion of the first magnetic shield of the enclosure when the cover is fastened in place.

11. The digital radiographic detector of claim 10 wherein at least one of the one or more segments of nanocrystalline material is electrodeposited or adhesively bonded.

12. The digital radiographic detector of claim 10 further comprising an additional magnetic shield that extends along one or more surfaces of the enclosure, wherein the additional magnetic shield is the nanocrystalline material and the metallic alloy provided at portions of the enclosure to protect selected components of the detector panel.

13. The digital radiographic detector of claim 10 further comprising one or more segments of the magnetic alloy adhesively bonded to one or more surfaces of the one or more side walls of the enclosure.

14. A digital radiographic detector comprising:
a detector panel forming digital image data according to radiation exposure energy;
an enclosure housing the detector panel, the enclosure formed from an electrically conductive material without a magnetic shielding capability and having a base with an inner base surface and an outer base surface and having, along its perimeter, one or more side walls that extend orthogonally from the inner base surface;
one or more layers of a nanocrystalline material including a first magnetic shielding capability extending at least along both inner and outer surfaces of portions of the enclosure and forming a base magnetic shield, the base magnetic shield covering inner corners of the enclosure;
at least a first segment of a magnetic metallic alloy including a second magnetic shielding capability attached to conform to at least one surface of the enclosure, the at least one surface of the enclosure to correspond to a magnetically sensitive component of the detector panel; and
a cover formed from a non-conductive material without a magnetic shielding capability and having a cover magnetic shield of the metallic alloy or the nanocrystalline material at an inner surface, the cover magnetic shield having a reduced thickness relative to the enclosure to pass x-rays and extending to overlap a portion of a side wall magnetic shield of the enclosure when the cover is fastened in place.

15. The digital radiographic detector of claim 14 wherein at least one of the one or more layers of nanocrystalline material is adhesively bonded to the enclosure.

16. The digital radiographic detector of claim 14 wherein the first segment of the magnetic metallic alloy has a thickness of 0.005 inch or 0.127 mm or less and wherein the cover magnetic shield has a thickness of 0.002 inch or 0.05 mm or less.

17. The digital radiographic detector of claim 14 wherein the first segment of the magnetic metallic alloy is adhesively bonded using an adhesive taken from the group consisting of a pressure-sensitive adhesive, an epoxy, and a heat-cured adhesive.

18. A method for providing electromagnetic shielding of a digital radiographic detector, the method comprising:
    forming an enclosure for a detector panel, wherein the enclosure is formed from an electrically conductive material to provide a Faraday shielding capability and has a base with an inner base surface and an outer base surface and a plurality of side walls extending from the inner base surface along the perimeter of the base, wherein each side wall has an inner wall surface and an outer wall surface;
    forming a base magnetic shield of one or more layers of nanocrystalline material extending at least along the inner and outer base surfaces;
    forming a side wall magnetic shield by adhesively bonding one or more segments of a magnetic metallic alloy to conform to one or more surfaces of the side wall and joining the side wall magnetic shield to the base magnetic shield at an overlap; and
    forming a cover of a non-conductive material and bonding a cover magnetic shield of the metallic alloy to an inner surface, the cover magnetic shield extending to overlap a portion of the side wall magnetic shield of the enclosure when the cover is fastened in place.

19. The method of claim 18 wherein forming the side wall magnetic shield further comprises:
    adhering a length of the magnetic metal alloy to a support backing using a releasable adhesive;
    aligning the length of the magnetic metal alloy along a top edge of the side wall;
    pivoting the support backing about the top edge to adhere a first portion of the length of the magnetic metal alloy along the side wall;
    pivoting the support backing about a corner along which the side wall meets the base to adhere a second portion of the length of the magnetic metal alloy to the side wall; and
    releasing the length of the magnetic metal alloy from the support backing.

* * * * *